United States Patent
Meschenmoser et al.

(10) Patent No.: US 10,947,053 B2
(45) Date of Patent: Mar. 16, 2021

(54) PRODUCTION SYSTEM FOR SPECTACLE LENSES

(71) Applicant: Carl Zeiss Vision International GmbH, Aalen (DE)

(72) Inventors: Ralf Meschenmoser, Essingen (DE); Arne Schulz, Leonberg (DE); Dennis Klora, Ellwangen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 95 days.

(21) Appl. No.: 16/444,768

(22) Filed: Jun. 18, 2019

(65) Prior Publication Data

US 2019/0382208 A1 Dec. 19, 2019

Related U.S. Application Data

(63) Continuation of application No. PCT/EP2017/081972, filed on Dec. 8, 2017.

(30) Foreign Application Priority Data

Dec. 19, 2016 (EP) ..................................... 16205102

(51) Int. Cl.
*B65G 37/02* (2006.01)
*B65G 29/00* (2006.01)
(Continued)

(52) U.S. Cl.
CPC ............. *B65G 37/02* (2013.01); *B65G 29/00* (2013.01); *B65G 35/06* (2013.01); *B65G 47/53* (2013.01);
(Continued)

(58) Field of Classification Search
CPC ........ B65G 15/12; B65G 37/02; B65G 29/00; B65G 35/06; B65G 47/53;
(Continued)

(56) References Cited

U.S. PATENT DOCUMENTS

| 5,626,080 A | 5/1997 | Trenner et al. |
| 8,490,781 B2 | 7/2013 | Meschenmoser et al. |

(Continued)

FOREIGN PATENT DOCUMENTS

| CN | 104271475 A | 1/2015 |
| DE | 3601699 A1 | 7/1987 |

(Continued)

OTHER PUBLICATIONS

Office action by the Chinese Patent Office issued in CN 201780086850.X, which is a counterpart hereof, dated Apr. 10, 2020, and English-language translation thereof.

(Continued)

*Primary Examiner* — James R Bidwell
(74) *Attorney, Agent, or Firm* — Thrive IP®; Georg M. Hasselmann

(57) ABSTRACT

Disclosed is a production system for spectacle lenses made from spectacle lens blanks, having a left-hand outer transport track, multiple left-hand processing devices which are arranged on the left-hand side next to the left-hand outer transport track, a right-hand outer transport track, and a central transport track which is arranged between the left-hand outer transport track and the right-hand outer transport track. The transport direction of the left-hand outer transport track and the transport direction of the right-hand outer transport track are identical, and the transport direction of the central transport track is opposite to the transport directions of the left-hand outer transport track and the right-hand outer transport track or can be reversed. The multiple right-hand processing devices are arranged on the right-hand side next to the right-hand outer transport track. A processing device pair made of left-hand and right-hand processing devices is paired with a transfer device.

18 Claims, 6 Drawing Sheets

(51) Int. Cl.
*B65G 35/06* (2006.01)
*B65G 47/53* (2006.01)
*B24B 13/00* (2006.01)
*B24B 41/00* (2006.01)

(52) U.S. Cl.
CPC ......... *B24B 13/0037* (2013.01); *B24B 41/005* (2013.01); *B65G 2207/14* (2013.01); *B65G 2207/18* (2013.01)

(58) Field of Classification Search
CPC ........ B65G 2201/0235; B65G 2207/14; B65G 2207/18; B65G 2203/04; B24B 27/00; B24B 13/00; B24B 41/005
USPC ......................................................... 198/817
See application file for complete search history.

(56) References Cited

U.S. PATENT DOCUMENTS

| | | | |
|---|---|---|---|
| 9,670,002 B2 | 6/2017 | Kato | |
| 9,840,373 B2 | 12/2017 | Schneider | |
| 9,908,714 B2 | 3/2018 | Schneider | |
| 10,773,894 B2* | 9/2020 | Meschenmoser | B65G 47/53 |
| 2003/0161714 A1* | 8/2003 | Blattner | H01L 21/67718 198/347.1 |
| 2004/0235397 A1* | 11/2004 | Lack | B65G 65/00 451/41 |
| 2009/0013897 A1 | 1/2009 | Horn et al. | |
| 2009/0099686 A1 | 4/2009 | Yoshikawa et al. | |
| 2011/0023294 A1 | 2/2011 | Awata et al. | |
| 2013/0192954 A1 | 8/2013 | Fourney | |
| 2019/0329987 A1* | 10/2019 | Meschenmoser | B65G 47/53 |

FOREIGN PATENT DOCUMENTS

| | | |
|---|---|---|
| DE | 4036214 C2 | 12/1992 |
| DE | 19506670 A1 | 8/1996 |
| DE | 102007059303 A1 | 6/2009 |
| DE | 102009058125 A1 | 6/2011 |
| DE | 202012011690 U1 | 5/2013 |
| EP | 1947035 A1 | 7/2008 |
| EP | 2321200 B1 | 11/2016 |
| JP | 07117830 A | 5/1995 |
| WO | 03013992 A1 | 2/2003 |
| WO | 2013131656 A2 | 9/2013 |
| WO | 2015064268 A1 | 5/2015 |

OTHER PUBLICATIONS

Office action by the Canadian Patent Office issued in CA 3,049,925, which is a counterpart hereof, dated Apr. 17, 2020.
International Search Report issued in PCT/EP2017/081972, to which this application claims priority, and English-language translation thereof, dated Feb. 28, 2018.
Written Opinion issued in PCT/EP2017/081972, to which this application claims priority, dated Nov. 23, 2018.
International Preliminary Examination Report issued in PCT/EP2017/081972, to which this application claims priority, and English-language translation thereof, dated Apr. 11, 2019.
Updated International Preliminary Examination Report issued in PCT/EP2017/081972, to which this application claims priority, and English-language translation thereof, dated May 16, 2019.
Office action by the Chinese Patent Office issued in CN 201780086850.X, which is a counterpart hereof, dated Oct. 26, 2020, and English-language translation thereof.
Office action by the Canadian Patent Office (CIPO) issued in CA 3,049,925, which is a counterpart hereof, dated Aug. 29, 2019.
Office action by the Korean Patent Office (KIPO) issued in KR 10-2019-7021192, which is a counterpart hereof, dated Sep. 11, 2019, and English-language translation thereof.

* cited by examiner

PRODUCTION SYSTEM FOR SPECTACLE LENSES

CROSS REFERENCE TO RELATED APPLICATIONS

This application is a continuation application of international application PCT/EP2017/081972, filed Dec. 8, 2017, which claims priority to European patent application EP 16 205 102.3, filed on Dec. 19, 2016, both of which are hereby incorporated by reference in their entireties.

TECHNICAL FIELD

The disclosure relates to a production system for spectacle lenses according to the preamble of patent claims 1, 12 and 14 and to a method for operating a system for producing spectacle lenses from spectacle lens blanks according to the preamble of patent claims 11, 13 and 15.

BACKGROUND

Until now, the formation of a process line from a plurality of process devices has been conventional within the scope of spectacle lens production, the spectacle lens blanks to be processed passing therethrough in succession. Then, the process line is set, for example, to a certain sequence of process steps and a certain surface design of the spectacle lens. Conversion or use of a separate process line is necessary for various processes, for example for spectacle lenses that are to be conditioned and processed differently.

A consequence of this when producing different spectacle lenses is that there is a very unequal load on different process lines or that frequent conversion is necessary. The successive or linear passage through a predetermined sequence of process devices is disadvantageous in that further processing overall must be stopped should one of the process devices fail. Further, an optimal load of various process devices is not possible in conventional process lines, particularly if the process devices have different capacities.

Usually, all process devices and transport devices, which transport the spectacle lens blanks to the respective process devices of the process line, are controlled by a central controller. In particular, which process device processes which spectacle lens blank in what manner is set centrally, for example. Therefore, an extension has required much outlay to date in the case of existing process lines. Often, a complete reconstruction and new programming of the central controller are required in this case.

A multiplicity of embodiment variants are known for transport devices for transporting the spectacle lens blanks to the respective process devices.

By way of example, there are link chain conveyor belts with switches, as described in WO 03/013992 A1, for example. There are also rail systems of the type described in DE 195 06 670 A1. Further, roller conveyor systems exist, as are disclosed in EP 1 947 035 A1, for example. Finally, conveyor belts or belt conveyors are also known. An embodiment variant of a conveyor belt or belt conveyor can be gathered from DE 20 2012 011 690 U1, for example.

DE 20 2012 011 690 U1 describes an installation for producing spectacle lenses. The installation comprises a plurality of separate processing devices and a transfer system comprising belt conveyors or conveyor belts for transporting the spectacle lens blanks to be processed to and from the processing devices. A dedicated conveyor device is assigned to each processing device. The installation comprises a first transport track for conveying the spectacle lens blanks from one processing device to the next and a second parallel transport track for conveying the spectacle lens blanks in parallel. Transfer devices are arranged between the processing devices, the transfer devices serving to receive and temporarily store the spectacle lens blanks and, where required, convey the spectacle lens blanks onward, alternatively to a conveyor device or to the second transport track. The transfer devices and the conveyor devices of the processing devices form the first transport track. The transfer devices and the conveyor devices are independently actuatable. A third parallel transport track is provided for parallel conveyance or return conveyance and/or circulation. This allows the spectacle lens blanks to be transported to any desired processing device.

DE 10 2007 059 303 A1 discloses an installation with a main conveyor belt, which has at least two tracks circulating in the same direction. An outer track serves as an overtaking track, on which workpieces or workpiece carriers that should not be supplied to processing are transported onward. A change from one transport track to another transport track is implemented by sliders and associated stamps. Moreover, transverse conveyors with conveyor belts running in the opposite direction are assigned to each processing station, wherein workpieces or workpiece carriers to be processed are offloaded via corresponding switches from the main conveyor belt to the transverse conveyors for the purposes of processing in the respective processing station.

WO 2013/131656 A2, from which the disclosure proceeds, proposes an installation for processing spectacle lens blanks. Processing is implemented by means of various processing devices, between which a transfer device is arranged in each case. The transfer devices serve for both longitudinal and transverse conveyance.

Each processing device has a dedicated conveyor device, which is controlled by the processing device itself.

The transfer devices are controlled by a central transfer controller (also referred to as MES=manufacturing executive system). The transfer devices and the conveyor devices of the processing devices form a first transport track. The transfer devices are embodied to receive and temporarily store a spectacle lens blank and, where required, convey the spectacle lens blank onward, alternatively to a processing device following a conveyor device or to a second transport track.

The second transport track extends parallel to the first transport track. The second transport track is controllable independently of the first transport track. The second transport track is constructed from a plurality of conveyor devices that are drivable independently of one another, the conveyor devices in succession forming the second transport track, optionally with transfer devices arranged therebetween. The second transport track and corresponding transfer devices between the first and second transport track, typically between each processing device, facilitate overtaking by spectacle lens blanks where necessary, for example for processing spectacle lens blanks with a particular priority, and/or for circumvention or selection of certain processing devices. The conveying directions of the conveying devices and transfer devices forming the second transport track are reversible for reasons of flexibility.

Additionally, provision can be made of a third transport track for parallel conveyance, in particular return conveyance, of spectacle lens blanks or the (optionally empty) transport containers thereof. The return conveyance can be implemented to their initial position or to a suitable process device for further processing. The second and third transport track have mutually opposing conveying directions. The third transport track likewise extends parallel to the other transport tracks. The possibility of return conveyance by reversing the conveying direction of the second transport track and/or via the third transport track (or by way of a return conveyor connection) is considered advantageous.

US 2011/023294 A1 describes an appliance for installing electronic components. From FIG. 4 and the associated description, it is possible to gather a component installation part, arranged on the right-hand side and left-hand side of three transport lines. From FIG. 6, it is possible to gather a plurality of such component installation parts, arranged in succession on the left-hand and right-hand side of the transport lines. From this FIG. 6, it is furthermore possible to gather that the conveying direction of the central transport track is counter to the conveying direction of the outer transport tracks. This appliance is neither provided nor suitable for the production of spectacle lenses.

DE 10 2009 058125 A1 discloses a transport device for distributing various break bulk cargo items to a plurality of processing locations using a plurality of conveyors, comprising a first source and a second source. Furthermore, the document discloses a method for operating a transport device for distributing various break bulk cargo items to a plurality of processing locations using a plurality of conveyors, comprising a first source and a second source. A circular conveyor is present, the latter being guided from the first source around the second source in a closed arc. Longitudinal conveyors are guided from the second source to the processing locations via the circular conveyor. These form crossings, at which break bulk cargo items are simultaneously movable away from the crossing and to the crossing.

A rail-based ring-shaped transport system can be gathered from US 2009/013897 A1. As evidenced by FIG. 8 and the associated description, tools are arranged outside of the ring lying opposite one another. Within the ring, in which transport is implemented in one direction, three rails are arranged assigned to each tool pair, the rails being able to be connected to one another by arc-shaped rails, forming small rings in the process.

US 2009/0099686 A1 describes a comparatively complex workpiece transport system. The workpiece transport system according to FIG. 1 is constructed in the style of a diamond-like grid. A rotation unit is arranged at each node of the grid, the rotation unit rendering a change in the transport direction through 90° realizable. The rotation units/nodes are connected by linear transfer units whose transport directions are not changeable. There are process devices, which are arranged in opposing arrangement on two sides of the grid. A computing device is present; it can calculate the transport path.

SUMMARY

The present disclosure is based on the object of providing a system for producing spectacle lenses from spectacle lens blanks and a method for operating a system for producing spectacle lenses from spectacle lens blanks, for a high throughput.

This object is achieved by a production system having a left, right, and central transport track and a plurality of process devices, and by a method of operating a production system having a left, right, and central transport track and a plurality of process devices. Exemplary embodiments and refinements of the disclosure are disclosed below.

The system according to the disclosure for producing spectacle lenses from spectacle lens blanks comprises three transport tracks for transporting the spectacle lens blanks and a plurality of process devices. The three transport tracks are arranged next to one another. For reasons of distinguishability, the three transport tracks are referred to below as outer left transport track, outer right transport track and central transport track, which is arranged between the outer left transport track and outer right transport track. Each of these transport tracks is provided for transporting the spectacle lens blanks in a respective transport direction. These transport tracks serve to transport the spectacle lens blanks to the respective process devices, in which the spectacle lens blanks are processed until they are finished blanks or completely finished.

The disclosure not only provides for a plurality of process devices to be present to the left side of the outer left transport track, but also for a plurality of process devices for the spectacle lens blanks to be arranged on the right side of the outer right transport track. The plurality of process devices arranged to the left of the outer left transport track are referred to as left process devices below while the process devices arranged to the right of the outer right transport track are referred to as right process devices below.

The disclosure further provides for the transport direction of the outer left transport track and the transport direction of the outer right transport track to be identical. Moreover, the disclosure provides for the transport direction of the central transport track to be counter to the transport directions of the outer left transport track and the outer right transport track, or for the transport direction to be reversible. Transport direction should be understood to mean the movement direction of the respectively transported spectacle lens blank along the respective transport tracks in each case. This does not preclude a transfer of spectacle lens blanks occurring or being able to occur between the transport tracks. Nor is an intermittent complete lack of transport precluded. Rather, the intention is to express that, in the case of transportation along the transport tracks, the spectacle lens blanks are transported in the directions described above.

Within the scope of the present disclosure, a process device should be understood to mean any device in which at least one process step can be implemented on the respective spectacle lens blank in order to convert the latter into the final spectacle lens blank or finished spectacle lens.

Very generally, the term process device comprises all types of processing devices, conditioning devices and control devices, such as, devices for blocking, cooling, heating, moistening, drying, gassing, shaping and, in particular, machining, applying, polishing, checking and measuring, coating, and marking. Usually, these process devices are arranged in series, to be precise on both sides of the transport section formed by the three transport tracks.

Together the three transport tracks form a transport apparatus for transporting a spectacle lens blank from a receiving point, by way of which the spectacle lens blank is received, via the transport section, where there is a transfer to the respective process device and back again, and up to an output point, at which the processed spectacle lens blank can be removed in the finished or semifinished state.

Usually, the respective spectacle lens blank (or possibly a frame for the spectacle lens) is not placed directly on the transport track; instead, it is received by a suitable carrier that is guided along on the respective transport track. By way of example, such a carrier can be a holder or else a container. By way of example, a typical container is described in EP 2 321 200 B1.

According to the disclosure, one or more of the right process devices are arranged opposite one or more of the left process devices in relation to the left, right and central transport tracks, respectively forming one or more process device pairs in the process. Expressed differently, in this variant a process device is in each case arranged to the left of the left transport track and to the right of the right transport track in an opposing arrangement, at equal positions along the value-adding chain. A left and a right process device, which are arranged in opposing arrangement in relation to the transport section, form a process device pair in each case.

This measure facilitates optimized processing and handling with high flexibility and/or low spatial requirements, in particular also when taking account of different process speeds or capacities of different process devices.

A transfer device is assigned to such a process device pair. This transfer device serves to transfer the spectacle lens blanks between the left process device of the process device pair and the outer left transport track and the central transport track. Further, it serves to transfer the spectacle lens blanks between the right process device of the process device pair and the outer right transport track and the central transport track. A plurality of process device pairs may also be present, each pair having such a transfer device assigned in each case. Accordingly, a spectacle lens blank (or spectacle lens frame) can be supplied by way of the respective outer transport track to the respectively adjacent process device for value-adding processing. The central transport track serves for the return transport of the spectacle lens blank to an upstream process device in the value-adding chain, for example to undertake post-processing or another check.

According to the disclosure, one or more transfer devices each comprise a plurality of rotation/transport devices. Here, four of these rotation/transport devices of such a transfer device belong to the outer left transport track, four belong to the central transport track, and four belong to the outer right transport track. Accordingly, the outer left transport track comprises four outer left rotation/transport devices of the plurality of rotation/transport devices, the central transport track comprises four central rotation/transport devices of the plurality of rotation/transport devices, and the outer right transport track comprises four outer right rotation/transport devices of the plurality of rotation/transport devices of a transfer device assigned to a process device pair. Each of these rotation/transport devices, which typically have an identical embodiment, facilitate, firstly, the transport of the spectacle lens blank (or the carrier thereof) or of the spectacle lens frame (or the carrier thereof) along the respective transport track and, secondly, the transport of the spectacle lens blank (or the carrier thereof) to an adjacent transport track or an adjacent process device after an appropriate rotation. This configuration of the variant is distinguished by its modularity and simplicity. By way of example, the rotation/transport devices can be configured as rotatable double belt conveyors.

Regularly, an integer number n of spectacle lens blanks (or the carrier thereof) is situated on a rotation/transport device. The bearing surface for the spectacle lens blanks, carriers, transport containers or the like on a rotation/transport device, which is set by the belts of the double belt conveyors in the exemplary embodiment specified above, is chosen in such a way that one or more spectacle lens blanks, carriers, transport containers or the like find space.

The four outer left rotation/transport devices and the four central rotation/transport devices and the four outer right rotation/transport devices are arranged to form a 3×4 matrix. Within the meaning of the present disclosure, a matrix is understood to mean, very generally, a structure in the style of a table with fields assignable to rows and columns. In a plan view, the rotation/transport devices are arranged like the fields of a table having three rows and four columns. Such a 3×4 matrix can easily be assigned to a respective process device pair. Regularly, the rotation/transport devices are arranged immediately adjacent to one another within the matrix; i.e., no further rotation and/or transport devices are present between the rotation/transport devices forming the matrix.

The problem set forth at the outset is solved in its entirety by this exemplary embodiment of a production system. In particular, this is implemented by a choice of the transport direction, embodied in inventive fashion, along the value-adding chain and an arrangement of rotation/transport devices, matched thereto, between process devices arranged on two sides along the value-adding chain.

A further exemplary embodiment, which may be based on the two exemplary embodiments described last, provides for two further left rotation/transport devices to be arranged to the left of the four outer left rotation/transport devices. As an alternative or in addition thereto, two further right rotation/transport devices of the plurality of rotation/transport devices may be arranged to the right of the four outer right rotation/transport devices. These may also be constituent parts of the transfer device. These predominantly serve to temporarily store the spectacle lens blank and supply the latter to the respective process device.

In addition to the above-described transport tracks, the production system may have one (or possibly more) left central transport track for transporting the spectacle lens blanks in a transport direction, arranged between the outer left transport track and the central transport track. As an alternative or in addition thereto, it is also possible for one (or possibly more) right central transport track(s) for transporting the spectacle lens blanks in a transport direction to be present, arranged between the outer right transport track and the central transport track. These additional transport tracks may serve firstly for transport in the direction of the value-adding chain, for returning individual or a plurality of spectacle lens blanks and/or for temporarily storing the latter.

In the exemplary embodiment described last, it was found to be advantageous if the left central transport track comprises four left central rotation/transport devices of the plurality of rotation/transport devices and if, alternatively or additionally, the right central transport track comprises four right central rotation/transport devices of the plurality of rotation/transport devices. Accordingly, the rotation/transport devices associated with the transport tracks are typically arranged in the style of a 4×4 matrix or in the style of a 5×4 matrix.

As already described above in detail, the rotation/transport devices serve to transfer the spectacle lens blanks between the transport tracks and the adjacently arranged process devices of a respective process device pair. The rotation/transport devices have a rotational embodiment to this end. If the plurality of rotation/transport devices are embodied to be rotatable in 45° steps, as is provided in a particularly advantageous manner by the disclosure, a transfer of a spectacle lens blank is possible not only between rotation/transport devices of one row or one column of the matrix, but also between rotation/transport devices of adjacent rows and adjacent columns that are adjacent to one another in a diagonal direction. The effective transport speed of a spectacle lens blank along the value-adding chain can be significantly increased by way of this measure. Moreover, this opens up further options for temporarily storing the spectacle lens blanks.

For the same reason, it is expedient for the transport direction of the left central transport track to have a reversible configuration and/or for the transport direction of the right central transport track to have a reversible configuration; this represents a further exemplary embodiment of the disclosure.

While the above-described related art always describes it advantageous to design transport directions of all transport tracks to be reversible, the inventors of the production system presented here have recognized that this does not necessarily yield faster process control. Rather, it appears to be more advantageous not to modify the transport directions of the outer transport tracks, in particular, and, instead, leave these in the direction of increasing added value. Specifically, the inventors therefore propose that the transport direction of the outer left transport track is non-reversible and/or that the transport direction of the outer right transport track is non-reversible. The transport direction of the central transport track can also have a non-reversible embodiment. In this context, non-reversible means during standard operation, in particular during the entire process cycle, in relation to the processing of a spectacle lens blank to form the finished spectacle lens or to form the spectacle lens blank no longer to be processed in the production system. The term non-reversible does not relate to servicing or test operation, but only to the standard production process.

The outer left transport track of one exemplary embodiment of the production system according to the disclosure comprises one or more outer left transport devices, which is/are driven for transporting the spectacle lens blanks in the transport direction of the outer left transport track. Accordingly, the outer right transport track may alternatively or additionally comprise one or more outer right transport devices, which is/are driven for transporting the spectacle lens blanks in the transport direction of the outer right transport track. Finally, the central transport track may alternatively or additionally also comprise one or more transport devices, which is/are driven for transporting the spectacle lens blanks in the transport direction of the central transport track. Very generally, it is advantageous for each transport device and each rotation/transport device to have a dedicated transport drive. Moreover, it is advantageous if, in addition to the dedicated transport drive, each rotation/transport device also comprises a dedicated rotation drive, which may optionally be controlled independently of the transport drive. Consequently, the transport devices and the rotation/transport devices are actuatable in completely independent fashion. This achieves a high degree of flexibility.

Just like the rotation/transport devices, the transport devices, too, may be embodied as double belt conveyors. The transport devices of the two outer transport tracks serve to convey the spectacle lens blanks in the value-adding direction. Typically, conveying is only carried out in the value-adding direction. The transport devices of the central transport track serve to convey the spectacle lens blanks counter to the value-adding direction. Typically, conveying on the central transport track is only implemented counter to the value-adding direction.

For the same reason of providing a high degree of flexibility, an exemplary embodiment of the disclosure provides for a computing device to be present. The computing device can be configured to calculate a fastest transport path for transporting a predetermined spectacle lens blank of the spectacle lens blanks to a predetermined process device of the process devices. As an alternative or in addition thereto, the computing device is configured to calculate a shortest transport path for transporting a predetermined spectacle lens blank of the spectacle lens blanks to a predetermined process device of the process devices. A control device that is likewise present ensures that the predetermined spectacle lens blank is transported on the calculated transport path, in particular by an appropriate actuation of the transport devices and the rotation/transport devices, for example.

One aspect of the disclosure also relates to a method for operating a system for producing spectacle lenses from spectacle lens blanks. This method proceeds from a production system comprising an outer left transport track for transporting the spectacle lens blanks in a transport direction, a plurality of left process devices, arranged to the left of the outer left transport track, for the spectacle lens blanks, an outer right transport track for transporting the spectacle lens blanks in a transport direction and a central transport track, arranged between the outer left transport track and the outer right transport track, for transporting the spectacle lens blanks in a transport direction. The left process devices are configured to carry out at least one process step on the respective spectacle lens blank in order to convert the latter to the final spectacle lens blank or the finished spectacle lens.

Further, the production system comprises a plurality of right process devices, arranged to the right of the outer right transport track, for the spectacle lens blanks. The right process devices are configured to carry out at least one process step on the respective spectacle lens blank to convert the latter to the final spectacle lens blank or the finished spectacle lens. In pairs, one or more of the right process devices are arranged opposite one or more of the left process devices in relation to the left, right and central transport tracks, forming one or more process device pairs in the process. One or more of the process device pairs each have a transfer device, respectively assigned to a process device pair, for transferring the spectacle lens blanks between a respective left process device of the respective process device pair and the outer left transport track and the central transport track, and for transferring the spectacle lens blanks between a respective right process device of the respective process device pair and the outer right transport track and the central transport track At least one of the transfer devices comprises a plurality of rotation/transport devices, wherein (i) the outer left transport track comprises four outer left rotation/transport devices of the plurality of rotation/transport devices, (ii) the central transport track comprises four central rotation/transport devices of the plurality of rotation/transport devices, and (iii) the outer right transport track comprises four outer right rotation/transport devices of the plurality of rotation/transports devices.

According to the disclosure, provision is made for the spectacle lens blanks to be transported to one or more of the left process devices or to one or more of the plurality of right process devices, arranged to the right side of the outer right transport track, for the spectacle lens blanks via the outer left transport track and/or the outer right transport track and/or the central transport track. Further, the spectacle lens blanks are transported in the identical transport direction on the outer left transport track and on the outer right transport track. Finally, according to the solution according to the disclosure, the spectacle lens blanks on the central transport track are transported counter to the spectacle lenses on the outer left transport track and the spectacle lenses on the outer right transport track. The spectacle lens blanks are transported to one or more of the plurality of right process devices, arranged to the right side of the outer right transport track, for the spectacle lens blanks via the outer left transport track and/or the outer right transport track and/or the central transport track.

The problem set forth at the outset is solved in its entirety by this embodiment of a method for operating a production system. In particular, this is implemented by a choice of the transport direction, embodied in inventive fashion, along the value-adding chain, an arrangement of rotation/transport devices, matched thereto, between process devices arranged on two sides along the value-adding chain and the operation thereof, possible in autonomous and/or individual fashion.

A system for producing spectacle lenses from spectacle lens blanks that solves the problem set forth at the outset and that is an alternative to the production system described above comprises an outer left transport track for transporting the spectacle lens blanks in a transport direction, a plurality of left process devices for the spectacle lens blanks, the left process devices being arranged to the left of the outer left transport track and being configured to carry out at least one process step on the respective spectacle lens blank in order to convert the latter into the final spectacle lens blank or finished spectacle lens, an outer right transport track for transporting the spectacle lens blanks in a transport direction and a central transport track arranged between the outer left transport track and the outer right transport track, for transporting the spectacle lens blanks in a transport direction. The transport direction of the outer left transport track and the transport direction of the outer right transport track are identical and the transport direction of the central transport track is counter to the transport directions of the outer left transport track and outer right transport track or reversible.

The disclosure is characterized in that a plurality of right process devices for the spectacle lens blanks are present, arranged to the right of the outer right transport track, the right process devices being configured to carry out at least one process step on the respective spectacle lens blank to convert the latter into the final spectacle lens blank or finished spectacle lens.

In pairs, one or more of the right process devices are arranged opposite one or more of the left process devices in relation to the left, right and central transport tracks, forming one or more process device pairs in the process. One or more of the process device pairs each have a transfer device, respectively assigned to a process device pair, for transferring the spectacle lens blanks between a respective left process device of the respective process device pair and the outer left transport track and the central transport track, and for transferring the spectacle lens blanks between a respective right process device of the respective process device pair and the outer right transport track and the central transport track At least one of the transfer devices comprises a plurality of rotation/transport devices, wherein each rotation/transport device has a dedicated transport drive and a dedicated rotation drive, wherein (i) the outer left transport track comprises four outer left rotation/transport devices of the plurality of rotation/transport devices, (ii) the central transport track comprises four central rotation/transport devices of the plurality of rotation/transport devices, and (iii) the outer right transport track comprises four outer right rotation/transport devices of the plurality of rotation/transports devices, as is already described above in relation to the first configuration of the production system.

The corresponding method according to the second configuration of the disclosure for operating a system for producing spectacle lenses from spectacle lens blanks, which comprises an outer left transport track for transporting the spectacle lens blanks in a transport direction, a plurality of left process devices for the spectacle lens blanks—these left process devices being arranged to the left of the outer left transport track and being configured to carry out at least one process step on the respective spectacle lens blank in order to convert the latter into the final spectacle lens blank or finished spectacle lens—an outer right transport track for transporting the spectacle lens blanks in a transport direction and a central transport track arranged between the outer left transport track and the outer right transport track, for transporting the spectacle lens blanks in a transport direction, is designed in such a way that the spectacle lens blanks are transported to one or more of the left process devices via the outer left transport track and/or the outer right transport track and/or the central transport track. Furthermore, the method provides for the spectacle lens blanks to be transported in the identical transport direction on the outer left transport track and on the outer right transport track, and for the spectacle lens blanks on the central transport track to be transported in the opposite or in the same transport direction as the spectacle lenses on the outer left transport track and the spectacle lenses on the outer right transport track.

The method according to the disclosure is based on a production system which comprises a plurality of right process devices for the spectacle lens blanks, arranged to the right of the outer right transport track, the right process devices being configured to carry out at least one process step on the respective spectacle lens blank in order to convert the latter into the final spectacle lens blank or finished spectacle lens.

In pairs, one or more of the right process devices are arranged opposite one or more of the left process devices in relation to the left, right and central transport tracks, forming one or more process device pairs in the process. One or more of the process device pairs each have a transfer device, respectively assigned to a process device pair, for transferring the spectacle lens blanks between a respective left process device of the respective process device pair and the outer left transport track and the central transport track, and for transferring the spectacle lens blanks between a respective right process device of the respective process device pair and the outer right transport track and the central transport track At least one of the transfer devices comprises a plurality of rotation/transport devices, wherein (i) the outer left transport track comprises four outer left rotation/transport devices of the plurality of rotation/transport devices, (ii) the central transport track comprises four central rotation/transport devices of the plurality of rotation/transport devices, (iii) the outer right transport track comprises four outer right rotation/transport devices of the plurality of rotation/transports devices.

According to the disclosure, each rotation/transport device comprises a dedicated transport drive and a dedicated rotation drive.

A further system for producing spectacle lenses from spectacle lens blanks that solves the problem set forth at the outset and that is an alternative to the production system described above comprises an outer left transport track for transporting the spectacle lens blanks in a transport direction, a plurality of left process devices for the spectacle lens blanks, the left process devices being arranged to the left of the outer left transport track and being configured to carry out at least one process step on the respective spectacle lens blank to convert the latter into the final spectacle lens blank or finished spectacle lens, an outer right transport track for transporting the spectacle lens blanks in a transport direction and a central transport track arranged between the outer left transport track and the outer right transport track, for transporting the spectacle lens blanks in a transport direction.

According to the disclosure, the transport direction of the outer left transport track and the transport direction of the outer right transport track are identical. The transport direction of the central transport track is counter to the transport directions of the outer left transport track and the outer right transport track, or the transport direction is reversible.

A plurality of right process devices for the spectacle lens blanks are present, arranged to the right of the outer right transport track, the right process devices being configured to carry out at least one process step on the respective spectacle lens blank in order to convert the latter into the final spectacle lens blank or finished spectacle lens. Further, a computing device is present and configured to calculate a fastest and/or a shortest transport path for transporting a predetermined spectacle lens blank of the spectacle lens blanks to a predetermined process device of the process devices. Finally, a control device is present to transport the predetermined spectacle lens blank on the calculated transport path.

The problem set forth at the outset is solved in its entirety by this exemplary embodiment of a production system. In particular, this is implemented by a choice of the transport direction, embodied in inventive fashion, along the value-adding chain and a workpiece transport, matched thereto, between process devices arranged on two sides along the value-adding chain.

The corresponding method according to the disclosure for operating a system for producing spectacle lenses from spectacle lens blanks, which comprises an outer left transport track for transporting the spectacle lens blanks in a transport direction, a plurality of left process devices for the spectacle lens blanks, the left process devices being arranged to the left of the outer left transport track and being configured to carry out at least one process step on the respective spectacle lens blank in order to convert the latter into the final spectacle lens blank or finished spectacle lens, a plurality of right process devices for the spectacle lens blanks arranged to the right of the outer right transport track, the right process devices being configured to carry out at least one process step on the respective spectacle lens blank in order to convert the latter into the final spectacle lens blank or finished spectacle lens, an outer right transport track for transporting the spectacle lens blanks in a transport direction and a central transport track arranged between the outer left transport track and the outer right transport track, for transporting the spectacle lens blanks in a transport direction.

The method according to the disclosure is distinguished by virtue of the spectacle lens blanks being transported to one or more of the left process devices via the outer left transport track and/or the outer right transport track and/or the central transport track, the spectacle lens blanks being transported in the identical transport direction on the outer left transport track and on the outer right transport track, and the spectacle lens blanks on the central transport track being transported in the opposite or in the same transport direction to the spectacle lenses on the outer left transport track and the spectacle lenses on the outer right transport track. Here,
  (i) a fastest transport path is calculated for transporting a predetermined spectacle lens blank of the spectacle lens blanks to a predetermined process device of the process devices and/or
  (ii) a shortest transport path is calculated for transporting a predetermined spectacle lens blank of the spectacle lens blanks to a predetermined process device of the process devices.

The problem set forth at the outset is solved in its entirety by this exemplary embodiment of a method for operating a production system. In particular, this is implemented by a choice of the transport direction, embodied in inventive fashion, along the value-adding chain and a workpiece transport, matched thereto, between process devices arranged on two sides along the value-adding chain.

In conjunction with the respective method, the subject matter of the disclosure also relates to a computer program with program code for carrying out the method steps described above when the computer program is loaded onto a computer and/or executed on a computer.

The object set forth at the outset is achieved in its entirety by these methods and the computer program programmed to carry out the respective methods.

The method implemented on the computer with the aid of the computer program may also include the method step of controlling the transfer of one of the spectacle lens blanks between the above-descried transport tracks and the supply to and removal from a respective process device.

The computer program may also comprise control commands for driving the transport devices described in relation to a variant according to the disclosure, in particular the double conveyor belts. Further, the computer program may include the control commands for the transport drive (e.g., double conveyor belts) and the rotation drive (e.g., a stepper motor) of the rotation/transport devices described in relation to a variant.

Further, provision is also made for the computer program to comprise an algorithm that serves to calculate the above-described shortest or quickest transport path.

BRIEF DESCRIPTION OF THE DRAWINGS

The disclosure will now be described with reference to the drawings wherein.

DESCRIPTION OF EXEMPLARY EMBODIMENTS

Figure 1:
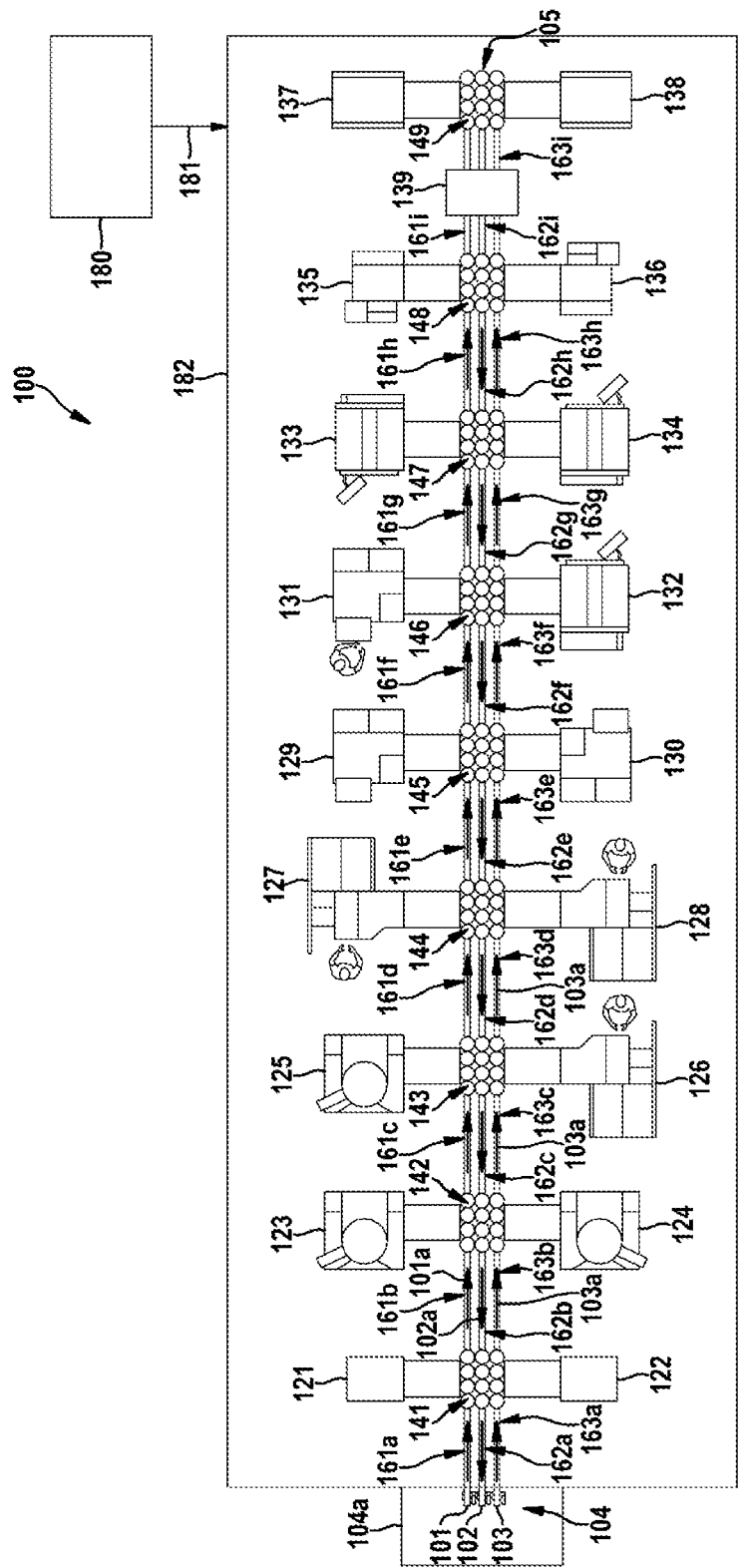
FIG. 1 shows a plan view from above of a first exemplary embodiment of a production system according to the disclosure.

FIG. 1 shows a first exemplary embodiment of a system 100 according to the disclosure for producing spectacle lenses from spectacle lens blanks, in a plan view from above.

The production system comprises three transport tracks 101, 102, 103 for transporting the spectacle lens blanks and a plurality of process devices 121, 122, . . . 137, 138. The three transport tracks 101, 102, 103 are arranged next to one another. In order to be able to distinguish the three transport tracks 101, 102, 103, these are, as already explained above, denoted outer left transport track 101, outer right transport track 103 and central transport track 102. Each of these transport tracks 101, 102, 103 is provided to transport the spectacle lens blanks in a respective transport direction 101a, 102a, 103a. These transport tracks 101, 102, 103 serve to transport the spectacle lens blanks to the respective process devices 121, 122, . . . 137, 138, in which the spectacle lens blanks are processed until they are finished blanks or completely finished. Accordingly, together the three transport tracks 101, 102, 103 form a transport apparatus for transporting a spectacle lens blank from a receiving point 104, by way of which the spectacle lens blank is received, via the transport section, where there is a transfer to the respective process device 121, 122, . . . 137, 138 and back to the transport section, and up to an output point 105, at which the processed spectacle lens blank can be removed in the finished or semifinished state.

A plurality of process devices 121, 123, 125, 127, 129, 131, 133, 135, 137 are arranged next to the outer left transport track 101. Likewise, a plurality of process devices 122, 124, 126, 128, 130, 132, 134, 136, 138 for the spectacle lens blanks are arranged next to the outer right transport track 103. The process device 121 is a blocker device for blocking the spectacle lens blanks. The process device 122 is a measuring device for measuring the surface contour of the blocked area of the spectacle lens blank. The process devices 123, 124, 125 are milling devices. The process devices 126, 127, 128 are machining turning devices. The process devices 129, 130, 131 are conditioning devices. The process devices 132, 133, 134 are pre-polishing devices and the process devices 135, 136 are post-polishing devices. The process device 137 is a marking device and the process device 138 is a quality control device. A further process device 139, which spans all three transport tracks 101, 102, 103, is a cleaning device 140.

It is possible to gather from FIG. 1 that the transport direction 101a of the outer left transport track 101 and the transport direction 103a of the outer right transport track 103 are identical. By contrast, the transport direction 102a of the central transport track 102 is counter to the transport directions 101a, 103a of the outer left transport track 101 and the outer right transport track 103. Transport direction should be understood to mean the movement direction of the respectively transported spectacle glass blank along the respective transport tracks 101, 102, 103 in each case. This does not preclude a transfer of spectacle lens blanks occurring or being able to occur at transfer points, described below, between the transport tracks 101, 102, 103. The spectacle lens blanks are transported with the aid of a receptacle container during the respective transport proceeding from the receptacle 104. The spectacle lens blanks, e.g., the semifinished products, are usually placed in pairs in this transport container. In this context, in pairs means that the spectacle lens blanks stored in a transport container are destined for the two spectacle lenses of spectacles of a user.

It is possible to gather from FIG. 1 that two process devices, which are arranged opposite one another in relation to the transport apparatus, respectively form a process device pair in each case. Thus, the process devices 121 and 122 form a process device pair. Further, the process devices 123 and 124 form a process device pair. The process devices 125 and 126 also form a process device pair, etc.

A transfer device 141, 142, 143, . . . 146, 147, 148, 149 is assigned to each process device pair 121, 122; 123, 124; 125, 126; . . . 135, 136; 137, 138. These transfer devices 141, 142, 143, . . . 146, 147, 148, 149 serve to transfer the spectacle lens blanks between the respective left process device 121, 123, 125, 127, 129, 131, 133, 135, 137, 139 of the process device pair 121, 122; 123, 124; 125, 126; . . . 135, 136; 137, 138 and the outer left transport track 101 and the central transport track 102. Further, the transfer devices 141, 142, 143, . . . 146, 147, 148, 149 serve to transfer the spectacle lens blanks between the respective right process device 122, 124, 126, 128, 130, 132, 134, 136, 138 of the process device pair 121, 122; 123, 124; 125, 126; . . . 135, 136; 137, 138 and the outer right transport track 103 and the central transport track 102. Accordingly, a spectacle lens blank can be supplied by way of the respective outer transport track 101, 103 to the respectively adjacent process device (e.g., the process device 127) for value-adding processing. The central transport track 102 serves to transport the spectacle lens blank back to a preceding process device in the value-adding chain (e.g., to the process device 126 or to the process device 125 or to the process device 121 proceeding from the process device 127, etc.) in order to undertake post-processing or a renewed check, for example.

In addition to the transfer devices 141, 142, 143, . . . 146, 147, 148, 149 that span all transport tracks 101, 102, 103, each transport track 101, 102, 103 comprises a plurality of transport devices 161a, 162a, 163a, 161b, 162b, 163b . . . 161h, 162h, 163h, 161i, 162i, 163i, which are embodied as double belt conveyors. The transport devices 161a, 161b, 161c, . . . 161h, 161i; 163a, 163b, 163c, . . . 163h, 163i of the two outer transport tracks 101, 103 serve to convey the spectacle lens blanks in the value-adding direction. Conveying is only carried out in the value-adding direction. The transport devices 162a, 162b, 162c, . . . 162h, 162i of the central transport track 102 serve to convey the spectacle lens blanks counter to the value-adding direction. Conveying on the central transport track 102 is only implemented counter to the value-adding direction.

Figure 2:
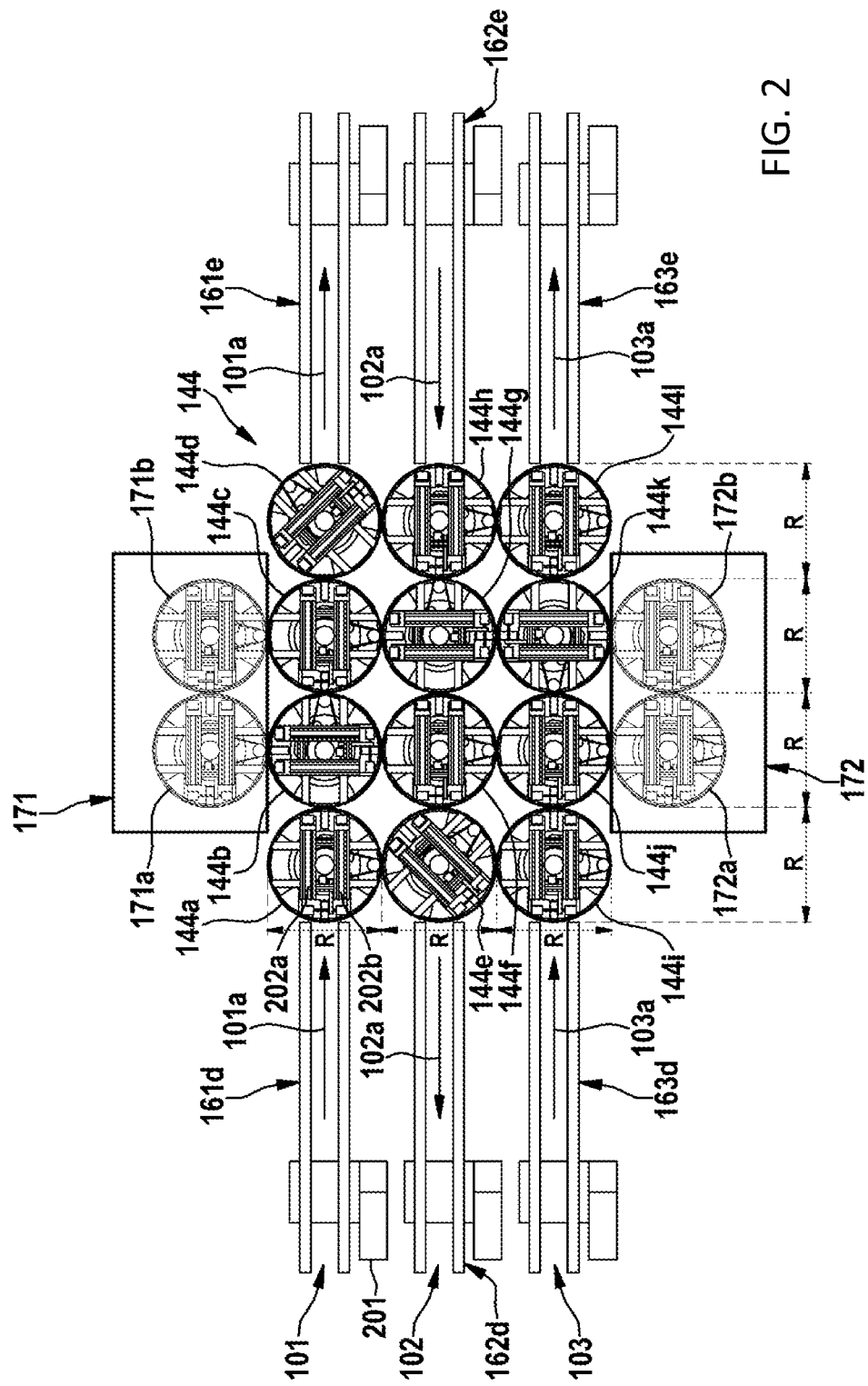
FIG. 2 shows a section relating to the conveyor technology from the production system according to the disclosure according to FIG. 1.

The transport devices 161a, 161b, . . . 161i, 162a, 162b, . . . 162i, 163a, 163b, . . . 163i and the transfer devices 141, 142, 143, . . . 146, 147, 148, 149 have an identical embodiment. FIG. 2 shows a section of FIG. 1, where six transport devices 161d, 161e, 162d, 162e, 163d, 163e of the transfer device 144 and two supply/intermediate storage modules 171, 172 for the process devices 127, 128 can be seen.

Figure 4:
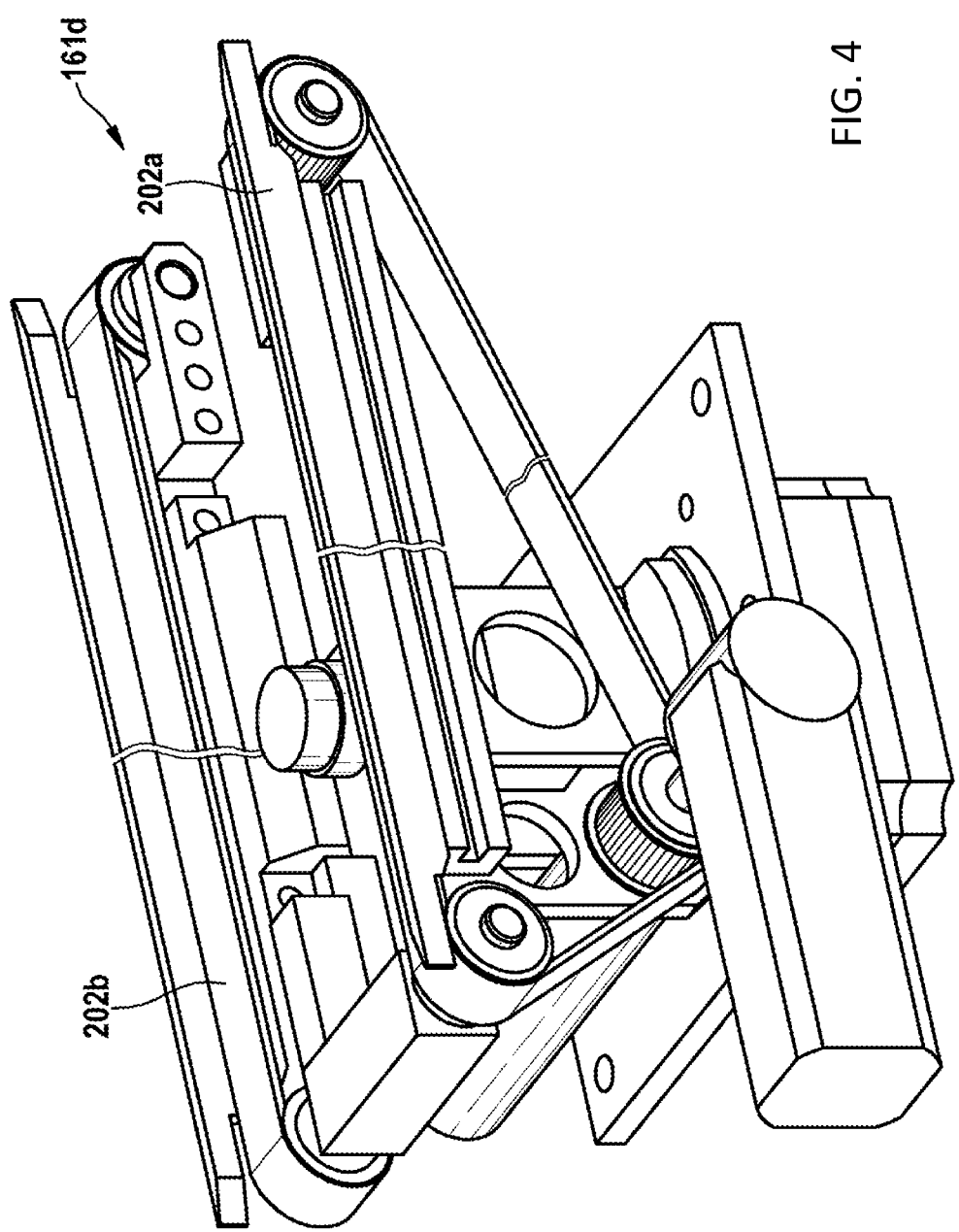
FIG. 4 shows a perspective view of a transport device.

FIG. 4 shows the transport device 161d in exemplary fashion. This transport device 161d comprises a motor-type drive 201 and two belts 202a, 202b, which are driven by the motor-type drive 201. The two belts 202a, 202b serve as a bearing surface for the above-described transport container for the spectacle lens blanks.

The transfer device 144 comprises twelve rotation/transport devices 144a, 144b, 144c, . . . 144i, 144j, 144k, 144l. Here, the four rotation/transport devices 144a, 144b, 144c, 144d of the transfer device 144 belong to the outer left transport track 101, the four rotation/transport devices 144e, 144f, 144g, 144h belong to the central transport track 102 and the four rotation/transport devices 144i, 144j, 144k, 144l belong to the outer right transport track 103. Consequently, they form a 3×4 matrix.

Two further rotation/transport devices 171a, 171b; 172a, 172b are in each case arranged on both sides of the transfer device 144. These rotation/transport devices 171a, 171b; 172a, 172b form the two supply/intermediate storage modules 171, 172, which predominantly serve to temporarily store and supply the spectacle lens blank to the respective process device 127, 128.

Figure 5:
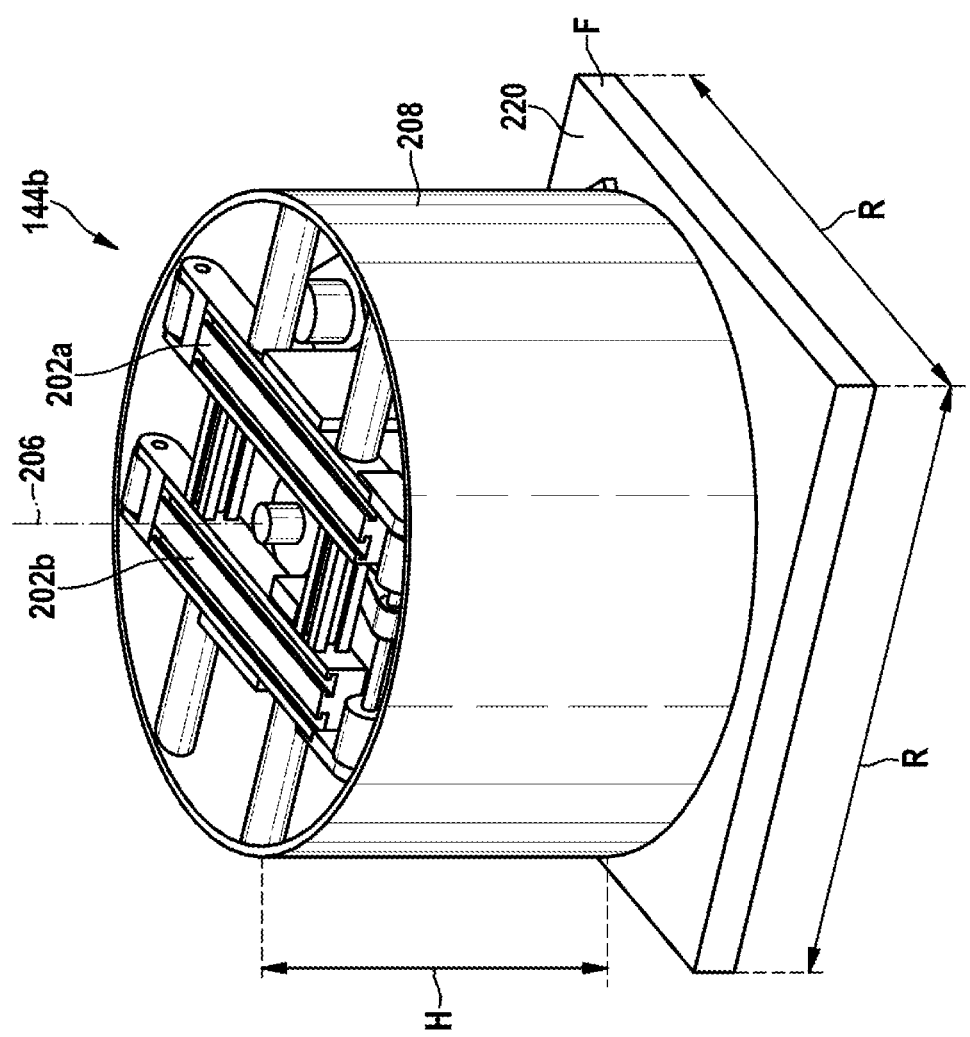
FIG. 5 shows a perspective view of a rotation/transport device.
Figure 6:
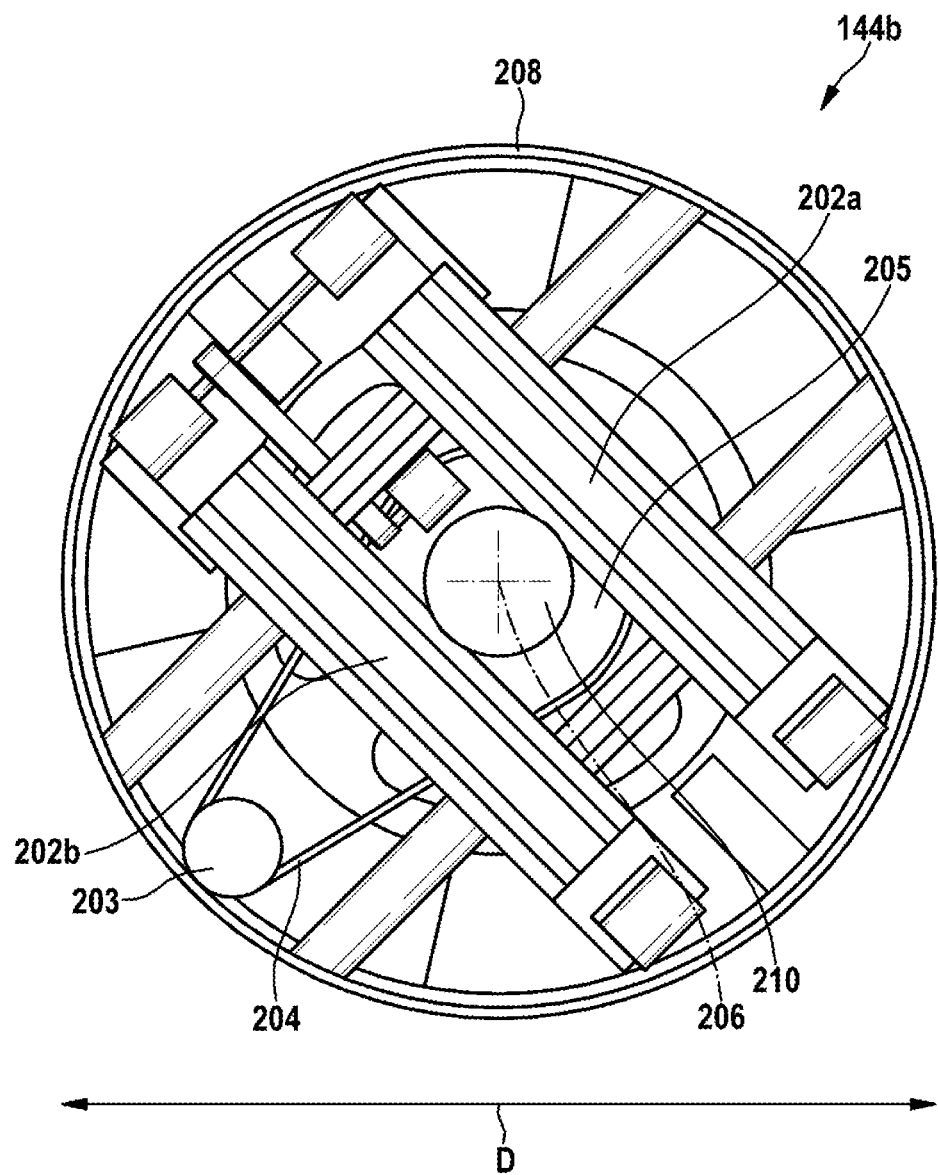
FIG. 6 shows a plan view of the rotation/transport device according to FIG. 5.

All rotation/transport devices 144a, 144b, 144c, . . . 144i, 144j, 144k, 144l; 171a, 171b; 172a, 172b have an identical embodiment. FIG. 5 shows a perspective illustration of the rotation/transport device 144b in exemplary fashion. FIG. 6 shows the same rotation/transport device 144b in a plan view from above. As a matter of principle, the rotation/transport device 144b comprises a transport device of the type shown in FIG. 4, with a motor-type drive 201 in a miniaturized embodiment and two belts 202a, 202b. Moreover, the rotation/transport device 144b has a rotation device with a motor-type drive 203, which can drive a wheel 205 by way of a belt 204 rotating about a vertical axis 206 and which can thus change the transport direction of the two belts 202a, 202b. The rotation/transport device 144b firstly facilitates the transport of the transport container along the transport track 101 and secondly, after an appropriate rotation, facilitates the transport of the transport container to the adjacent central transport track 102 or to the adjacent process device 127. Specifically, a transfer or handover of the transport container may take place, proceeding between the rotation/transport device 144b and the rotation/transport devices 144a, 144c, 144e, 144f, 144g, 171a, 171b. To this end, the rotation/transport device 144b is able to be rotated in 45° steps.

A computing device 180 is present to provide a high degree of flexibility. The computing device 180 is configured to calculate a fastest transport path for transporting a transport container with spectacle lens blanks to a predetermined process device (e.g., the process device 127). Further, the computing device 180 is configured to calculate a shortest transport path for transporting a predetermined spectacle lens blank of the spectacle lens blanks to a predetermined process device (e.g., the process device 127) of the process devices 121, 122; 123, 124; 125, 126; . . . 135, 136; 137, 138. Finally, an algorithm is saved in the computing device 180, the algorithm taking account of predetermined right-of-way rules when calculating the fastest or shortest transport path. A control device that is likewise present and, e.g., connected to the computing device 180 by way of a wireless link 181 ensures in particular, e.g., by way of an appropriate actuation of the transport devices 161a, 161b, . . . 161i, 162a, 162b, . . . 162i, 163a, 163b, . . . 163i and the rotation/transport devices 144a, 144b, 144c, . . . 144i, 144j, 144k, 144l; 171a, 171b; 172a, 172b that the transport container with the spectacle lens blanks is transported on the calculated transport path.

The transport speed of the transport devices 161a, 161b, . . . 161i, 162a, 162b, . . . 162i, 163a, 163b, . . . 163i and of the rotation/transport devices 144a, 144b, 144c, . . . 144i, 144j, 144k, 144l; 171a, 171b; 172a, 172b is greater than 10 m/min and can be variably regulated in the embodiment variant. Each rotation/transport device 144a, 144b, 144c, . . . 144i, 144j, 144k, 144l; 171a, 171b; 172a, 172b has an RFID reader station 210, preferably integrated to the point of rotation 206. Consequently, different transport containers, and hence different orders, can be tracked at all times and at all places in real time. The alignment in which the transport containers are transported is also irrelevant; i.e., it need no longer be ensured that the transport containers have a defined alignment with respect to the transport unit, specifically the belts 202a, 202b, for example (where the right/left spectacle lens blank lies in respect of the transport direction is irrelevant).

The upwardly pointing area of the rotation/transport devices 144a, 144b, 144c, . . . 144i, 144j, 144k, 144l; 171a, 171b; 172a, 172b is covered by no more than 50% in the plan view in order to facilitate use in an ISO Class 5 cleanroom. Consequently, a laminar airflow with a speed output of 0.3 (0.2-0.4 m/s) can flow through at the product plane. The transport containers overcome the distance to the next process device 127, 128 by means of advantageous double belt conveyors 202a, 202b.

The logic (movement, intermediate storage/parking, stopping for evasion or right-of-way rule) is handled on the in fact central transport track 102, in particular the rotation/transport devices 144e, 144f, 144g, 144h of the 3×4 matrix formed by the rotation/transport devices 144a, 144b, 144c, . . . 144i, 144j, 144k, 144l. The control device 182 of the production system 100 adopts the basic rules that are predetermined by the computing device 180, e.g., the PCS system by Quantum. A precondition lies in the continuous comparison of information. Each order can always be localized at the actual position in real time. The decisions in respect of the optimal transport path are made on the computing device level, to be precise "step-by-step" (n, n+1, n+2 etc.).

The respective two (or possibly more) rotation/transport devices 171a, 171b; 172a, 172b that form the supply/intermediate storage modules 171, 172 and that are arranged outside of the mass flow directly or indirectly serve the process devices 161a, 161b, . . . 161i, 162a, 162b, . . . 162i, 163a, 163b, . . . 163i (e.g., a polishing machine). This is regularly implemented by means of a 6-axis robot and double-swivel grippers, e.g., with vacuum suckers.

In principle, the production system 100 is scalable in X and Y. In addition to the above-described transport tracks 101, 102, 103, the production system 100 may have one (or possibly more) left central transport track 101Z for transporting the spectacle lens blanks in a transport direction, arranged between the outer left transport track 101 and the central transport track 102. Additionally, the production system may also have one (or possibly more) right central transport track(s) 103Z for transporting the spectacle lens blanks in a transport direction, arranged between the outer right transport track 103 and the central transport track 102, as is shown, for example, by FIG. 3 in sections.

Figure 3:
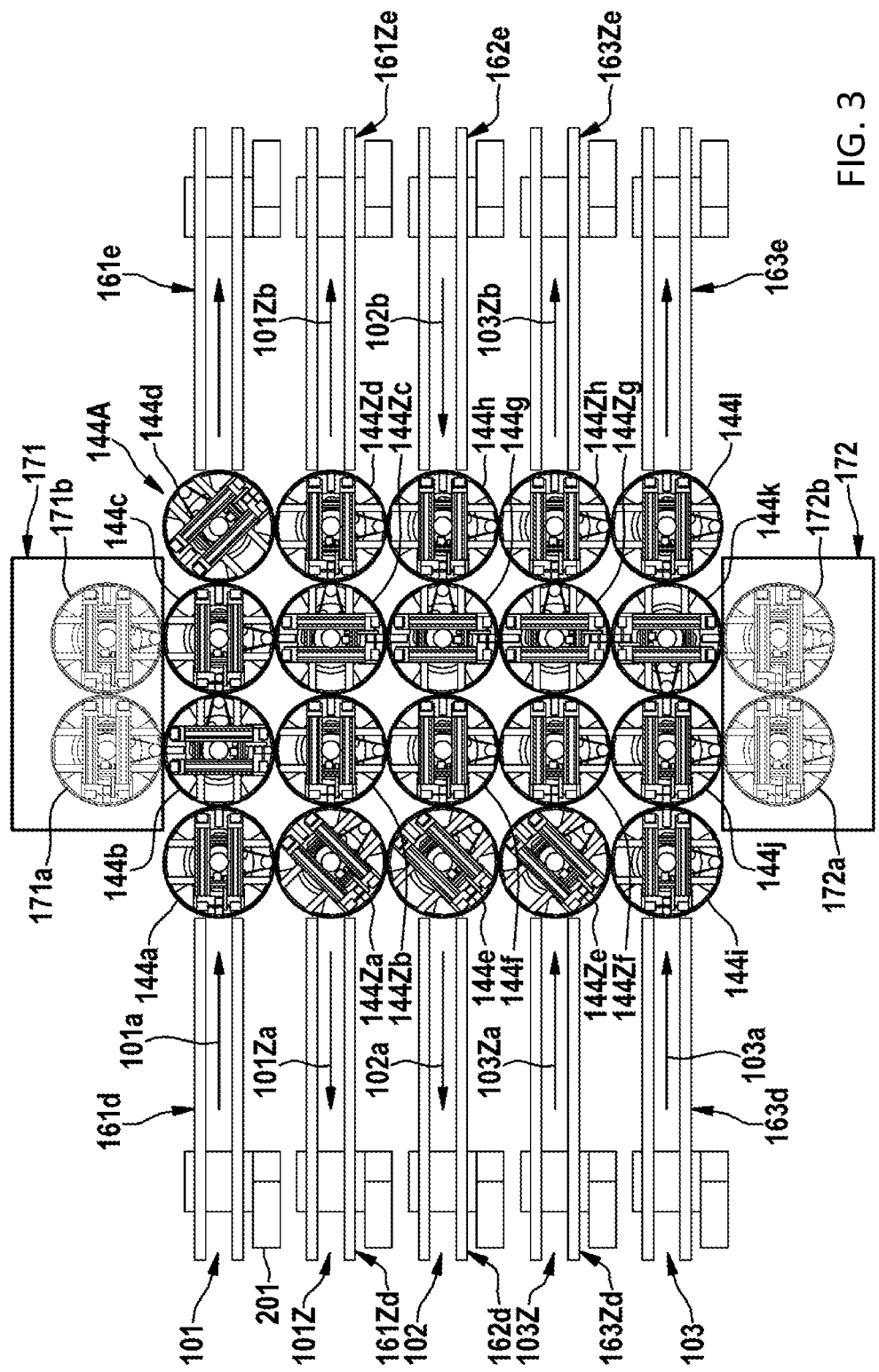
FIG. 3 shows a section from a production system according to the disclosure with an alternative embodiment variant to the conveyor technology shown in FIG. 2.

These transport tracks 101Z, 103Z present in addition to the transport tracks 101, 102, 103 can serve, firstly, for transportation in the direction of the value-adding chain, for returning and/or for temporarily storing transport containers with the spectacle lens blanks. FIG. 3 shows four of the transport devices 161Zd, 161Ze, 163Zd, 163Ze, which are constituent parts of the additional transport tracks 101Z, 103Z and which are present in addition to the transport devices 161a, 161b, . . . 161i, 162a, 162b, . . . 162i, 163a, 163b, . . . 163i.

The left central transport track 101Z comprises four left central rotation/transport devices 144Za, 144Zb, 144Zc, 144Zd. The right central transport track 103Z comprises four right central rotation/transport devices 144Ze, 144Zf, 144Zg, 144Zh. The rotation/transport devices 144a, 144b, 144c, . . . 144i, 144j, 144k, 144l and 144Za, 144Zb, 144Zc, 144Zd and 144Ze, 144Zf, 144Zg, 144Zh, assigned to the transport tracks 101, 101Z, 102, 103Z, 103, are arranged in the style of a 5×4 matrix, forming a transfer device 144A. Moreover, the rotation/transport devices 171a, 171b; 172a, 172b of the supply/intermediate storage modules 171, 172 are plotted.

In the embodiment variants described above and shown in FIGS. 2 to 6, the rotation/transport devices 144a, 144b, 144c, . . . 144i, 144j, 144k, 144l and 144Za, 144Zb, 144Zc, 144Zd have a height in respect to the base area of between 800 mm and 1200 mm, the conventional height being 950 mm. The module installation height H is approximately 200 mm (see FIG. 5) and the rotation/transport devices 144a, 144b, 144c, . . . 144i, 144j, 144k, 144l and 144Za, 144Zb, 144Zc, 144Zd are arranged in a grid R of 300 mm (see FIGS. 2 and 5). That is to say, the rotation/transport devices 144a, 144b, 144c, . . . 144i, 144j, 144k, 144l and 144Za, 144Zb, 144Zc, 144Zd have an external diameter D of 298 mm (see FIG. 6). Since the individual rotation/transport devices 144a, 144b, 144c, . . . 144i, 144j, 144k, 144l and 144Za, 144Zb, 144Zc, 144Zd have a closed outer ring 208 (see FIGS. 5 and 6), no pinching and shearing point arises, and consequently the respective entire matrix, which forms the transfer device 144 or 144A, can operate without housing and safety devices such as light barriers, for example.

A basic frame, on which both the rotation/transport devices 144a, 144b, 144c, . . . 144i, 144j, 144k, 144l and 144Za, 144Zb, 144Zc, 144Zd and the transport devices 161a, 161b, 161i, 162a, 162b, . . . 162i, 163a, 163b, . . . 163i, 161Zd, 161Ze, 163Zd, 163Ze are assembled, is situated in the lower region. The media routing of pressurized air, power supply (also for the process devices 121, 122; 123, 124; 125, 126; . . . 135, 136; 137, 138), process media, e.g., polishing means, and the like is all integrated at a level of between 200 mm and 600 mm with respect to the base area.

All rotation/transport devices (individual matrix modules) 144a, 144b, 144c, . . . 144i, 144j, 144k, 144l and 144Za, 144Zb, 144Zc, 144Zd have plug-in connections for a mechanical system, power supply, pneumatic system, sensor system/controller (SPS) etc., such that these can be quickly interchanged and put back into operation. This ensures short interruptions.

As explained in the general part of the description, the inventors of the production system 100 presented here have recognized that it is advantageous not to modify the transport directions 101a, 103a of the outer transport tracks 101, 103 and, instead, leave these in the direction of increasing added value. Specifically, the inventors propose that the transport direction 101a of the outer left transport track 101 is non-reversible and that the transport direction 103a of the outer right transport track 103 is non-reversible. The transport direction 102 of the central transport track 102 can also have a non-reversible embodiment. In this context, non-reversible means during standard operation, in particular during the entire process cycle, in relation to the processing of a spectacle lens blank to form the finished spectacle lens or to form the spectacle lens blank no longer to be processed in the production system 100. The term non-reversible does not relate to servicing or test operation, but only to the standard production process. If the transport direction is reversible, this does not necessarily mean that the transport direction is reversed over the entire transport track. Rather, the transport direction can also be reversed within individual sections, in particular on one or more transport devices and/or on one or more rotation/transport devices.

In the exemplary embodiment shown in FIG. 3, the respective transport direction 101Za, 102a, 102b of the transport devices 161Zd, 162d, 162e is counter to the value-adding direction and, in particular, counter to the respective transport direction 101a, 101Zb, 103Za, 103Zb, 103a of the remaining transport devices 161d, 161e, 161Ze, 163Ze, 163e, 163d, 163e. This reversed transport direction 161Zd, 162d, 162e is primarily implemented on account of the necessity of post-processing or for the purposes of a return transport of empty transport containers.

The operating method for the entire production system 100—naturally also in any development and, in particular, in the variant sketched out in FIG. 3 and described above—is computer-implemented and realized by way of an appropriate computer program with program code, which is situated on the computer, specifically represented, in particular, by the computing device 180 and the control device 182, and which is realized by the processors thereof.

It comprises the control of the transfer of the transport containers between the above-described transport tracks 101, 101Z, 102, 103Z, 103 and the supply to and removal from a respective process device 121, 122; 123, 124; 125, 126; . . . 135, 136; 137, 138.

The computer program also comprises control commands for driving the transport devices 161a, 161b, . . . 161i, 162a, 162b, . . . 162i, 163a, 163b, . . . 163i, 161Zd, 161Ze, 163Zd, 163Ze, in particular the double conveyor belts. It further comprises the control commands for the transport drive (e.g., double conveyor belts) and the rotation drive (e.g., a stepper motor) of the above-described rotation/transport devices 144a, 144b, 144c, . . . 144i, 144j, 144k, 144l and 144Za, 144Zb, 144Zc, 144Zd.

The computer program has an algorithm that serves to calculate the above-described shortest or quickest transport path. The logistics rules are calculated by algorithm in such a way that the transport devices 161a, 161b, . . . 161i, 162a, 162b, . . . 162i, 163a, 163b, . . . 163i, 161Zd, 161Ze, 163Zd, 163Ze and the rotation/transport devices 144a, 144b, 144c, . . . 144i, 144j, 144k, 144l and 144Za, 144Zb, 144Zc, 144Zd operate in self-regulating and autonomous fashion and even settle on the respective admissible production state WIP (work in production) of the respective spectacle lens blank. Rules such as "fastest path to the next station" or "shortest path" or "loaded goods have right-of-way" are predetermined. Special algorithms are used for the search for the best path, the algorithms considering the respective next states of the transport devices 161a, 161b, . . . 161i, 162a, 162b, . . . 162i, 163a, 163b, . . . 163i, 161Zd, 161Ze, 163Zd, 163Ze and the rotation/transport devices 144a, 144b, 144c, . . . 144i, 144j, 144k, 144l and 144Za, 144Zb, 144Zc, 144Zd and predetermining the next path for the transport containers by way of an algorithmic calculation. Here, the rotation/transport devices 144a, 144b, 144c, . . . 144i, 144j, 144k, 144l and 144Za, 144Zb, 144Zc, 144Zd also exploit the option of the flexible, diagonal path, which is decided by means of the algorithmic calculation.

Here, an integer number n of transport containers may be situated on a rotation/transport device 144a, 144b, 144c, . . . 144i, 144j, 144k, 144l and 144Za, 144Zb, 144Zc, 144Zd. The bearing surface for the transport containers on a rotation/transport device 144a, 144b, 144c, . . . 144i, 144j, 144k, 144l and 144Za, 144Zb, 144Zc, 144Zd, which is set by the belts 202a, 202b in the present exemplary embodiment, is chosen in such a way that one or more transport containers have space.

By means of neural networks, the spectacle lens blanks are input in an ideal fashion by an end-side buffer 104a (see FIG. 1) and supplied to the receptacle point 104 (together with appropriate transport containers). Here, the states of the process devices 121, 122; 123, 124; 125, 126; . . . 135, 136; 137, 138, the states of the tools used in these process devices 121, 122; 123, 124; 125, 126; . . . 135, 136; 137, 138, pending servicing or else most advantageous process device and order pairs are taken into account in each case. The orders are input to the manufacturing with the most advantageous order/process device combination in each case. The set WIP and Kanban signals present in this case represent a further influencing variable when inputting and also occupying the conveyor technology and load of the process devices 121, 122; 123, 124; 125, 126; ... 135, 136; 137, 138.

On account of the algorithmic calculation carried out by the computing device 180, it is possible that defective rotation/transport devices 144a, 144b, 144c, ... 144i, 144j, 144k, 144l and 144Za, 144Zb, 144Zc, 144Zd and optionally also transport devices 161a, 161b, ... 161i, 162a, 162b, ... 162i, 163a, 163b, ... 163i, 161Zd, 161Ze, 163Zd, 163Ze, identified by way of an appropriate sensor system or manually, are circumnavigated in automatic and self-regulating fashion as these are already masked during the search for the shortest or fastest path. For this purpose, the computing device 180 has an interface by way of which this information can be supplied.

After replacement of the defective module (rotation/transport devices 144a, 144b, 144c, ... 144i, 144j, 144k, 144l and 144Za, 144Zb, 144Zc, 144Zd or transport devices 161a, 161b, 161i, 162a, 162b, ... 162i, 163a, 163b, ... 163i, 161Zd, 161Ze, 163Zd, 163Ze) or the defective modules, the production system automatically uses these modules again. A status tag is used to this end.

Orders can be revised by running production or post-processing orders, for example.

Transport containers can be removed from the production system 100 at any point, for example for manual interventions, but they can likewise also be reintroduced at any point. The production system 100 immediately identifies the ID code of the order with the aid of the RFID reader station 210 attached to the point of rotation 206 and independently adapts its regulation (without human intervention).

The orders are forwarded, inter alia, to a next station (transport device, rotation/transport device, process device, etc.) by means of Kanban signals (so-called ConWIP or pacemaker signals).

These Kanban signals are provided with timers which allow an order to be driven out of the process devices independently in the case of a fault in order to be forwarded to another free process device. All of this is carried out without human intervention and by a self-regulating system realized on the computer.

As a result of all of these prescriptions, it is possible in the production system 100 for the orders either to be in motion or be processed in one of the process devices and hence for the ideal WIP to be set and for a throughput speed of only up to 1.2-times the sum of all process times to be possible.

The overall layout in the variant shown in FIG. 1 is linked in three circuits, with each being regulated in a so-called ConWIP (controlled work in production). Moreover, Kanban signals are only used within the circuits; this yields a hybrid control facilitating an ideal throughput/passage time.

An entirely straight-lined arrangement of the transport tracks as shown in FIG. 1 is the fastest variant; however, U/L forms and polygonal chains can be facilitated at all times. What is characteristic for all layout formations is that the transport direction for loaded goods is always maintained and only empty goods, post-processing work or, optionally, rejects are transported in the opposite direction.

Advantageous exemplary embodiment of the disclosure are the subject matter of the clauses specified below within the meaning of decision J15/88:

Clause 1. A system (100) for producing spectacle lenses from spectacle lens blanks, comprising
an outer left transport track (101) for transporting the spectacle lens blanks in a transport direction (101a),
a plurality of left process devices (121, 123, 125, 127, 129, 131, 133, 135, 137, 139) for the spectacle lens blanks, arranged to the left of the outer left transport track (101),
an outer right transport track (103) for transporting the spectacle lens blanks in a transport direction (103a),
a central transport track (102) arranged between the outer left transport track (101) and the outer right transport track (103), for transporting the spectacle lens blanks in a transport direction (102a),
characterized in that
a plurality of right process devices (122, 124, 126, 128, 130, 132, 134, 136, 138) for the spectacle lens blanks are present, arranged to the right of the outer right transport track (103),
the transport direction (101a) of the outer left transport track (101) and the transport direction (103a) of the outer right transport track (103) are identical,
the transport direction (102a) of the central transport track (102) is counter to the transport directions (101a, 103a) of the outer left transport track (101) and the outer right transport track (103) or reversible.

Clause 2. The production system (100) according to clause 1, characterized in that in pairs, one or more of the right process devices (122, 124, 126, 128, 130, 132, 134, 136, 138) are arranged lying opposite one or more of the left process devices (121, 123, 125, 127, 129, 131, 133, 135, 137, 139) in relation to the left, right and central transport tracks (101, 102, 103), forming one or more process device pairs (121, 122; 123, 124; 125, 126; ... 135, 136; 137, 138).

Clause 3. The production system (100) according to clause 2, characterized in that one or more of the process device pairs (121, 122; 123, 124; 125, 126; ... 135, 136; 137, 138) each have a transfer device (141, 142, 143, ... 146, 147, 148, 149), respectively assigned to a process device pair (121, 122; 123, 124; 125, 126; ... 135, 136; 137, 138), for transferring the spectacle lens blanks between a respective left process device (121, 123, 125, 127, 129, 131, 133, 135, 137, 139) of the respective process device pair (121, 122; 123, 124; 125, 126; ... 135, 136; 137, 138) and the outer left transport track (101) and the central transport track (102) and for transferring the spectacle lens blanks between a respective right process device (122, 124, 126, 128, 130, 132, 134, 136, 138) of the respective process device pair (121, 122; 123, 124; 125, 126; ... 135, 136; 137, 138) and the outer right transport track (103) and the central transport track (102).

Clause 4. The production system (100) according to clause 3, characterized in that at least one of the transfer devices (141, 142, 143, ... 146, 147, 148, 149) comprises a plurality of rotation/transport devices (144a, 144b, 144c, ... 144i, 144j, 144k, 144l and 144Za, 144Zb, 144Zc, 144Zd), wherein
(i) the outer left transport track (101) comprises four outer left rotation/transport devices (144a, 144b, 144c, 144d) of the plurality of rotation/transport devices (144a, 144b, 144c, ... 144i, 144j, 144k, 144l and 144Za, 144Zb, 144Zc, 144Zd),
(ii) the central transport track (102) comprises four central rotation/transport devices (144e, 144f, 144g, 144h) of the plurality of rotation/transport devices (144a, 144b, 144c, ... 144i, 144j, 144k, 144l and 144Za, 144Zb, 144Zc, 144Zd),
(iii) the outer right transport track (103) comprises four outer right rotation/transport devices (144i, 144j, 144k, 144l) of the plurality of rotation/transport devices (144a, 144b, 144c, . . . 144i, 144j, 144k, 144l and 144Za, 144Zb, 144Zc, 144Zd), Clause 5. The production system (100) according to clause 4, characterized in that the four outer left rotation/transport devices (144a, 144b, 144c, 144d) and the four central rotation/transport devices (144e, 144f, 144g, 144h) and the four outer right rotation/transport devices (144i, 144j, 144k, 144l) are arranged to form a 3×4 matrix.

Clause 6. The production system (100) according to clause 4 or 5, characterized in that two further left rotation/transport devices (171a, 171b) of the plurality of rotation/transport devices (144a, 144b, 144c, . . . 144i, 144j, 144k, 144l and 144Za, 144Zb, 144Zc, 144Zd) are arranged to the left-hand side of the four outer left rotation/transport devices (144a, 144b, 144c, 144d) and/or in that
two further right rotation/transport devices (172a, 172b) of the plurality of rotation/transport devices (144a, 144b, 144c, . . . 144i, 144j, 144k, 144l and 144Za, 144Zb, 144Zc, 144Zd) are arranged to the right-hand side of the four outer right rotation/transport devices (144i, 144j, 144k, 144l).

Clause 7. The production system (100) according to any one of the preceding clauses, characterized in that
a left central transport track (101Z) is present, arranged between the outer left transport track (101) and the central transport track (102), for transporting the spectacle lens blanks in a transport direction (101Za, 101Zb), and/or
a right central transport track (103Z) is present, arranged between the outer right transport track (103) and the central transport track (102), for transporting the spectacle lens blanks in a transport direction (103Za, 103Zb).

Clause 8. The production system (100) according to clause 7 when referring back to any one of clauses 4 to 6, characterized in that
(i) the left central transport track (101Z) comprises four left central rotation/transport devices (144Za, 144Zb, 144Zc, 144Zd) of the plurality of rotation/transport devices (144a, 144b, 144c, . . . 144i, 144j, 144k, 144l and 144Za, 144Zb, 144Zc, 144Zd),
(ii) the right central transport track (103Z) comprises four right central rotation/transport devices (144Ze, 144Zf, 144Zg, 144Zh) of the plurality of rotation/transport devices (144a, 144b, 144c, . . . 144i, 144j, 144k, 144l and 144Za, 144Zb, 144Zc, 144Zd), Clause 9. The production system (100) according to any one of clauses 4 to 6 or according to clause 7 when referring back to any one of clauses 4 to 6 or according to clause 8, characterized in that the plurality of rotation/transport devices (144a, 144b, 144c, . . . 144i, 144j, 144k, 144l and 144Za, 144Zb, 144Zc, 144Zd) are rotatable in 45° steps.

Clause 10. The production system (100) according to clause 7 or according to clause 8 or according to clause 9 when referring back to clause 7 or 8, characterized in that the transport direction (101Za, 101Zb) of the left central transport track (101Z) is reversible and/or
the transport direction (103Za, 103Zb) of the right central transport track (103Z) is reversible.

Clause 11. The production system (100) according to any one of the preceding clauses, characterized in that
the transport direction (101a) of the outer left transport track (101) is not reversible and/or
the transport direction (103a) of the outer right transport track (103) is not reversible and/or
the transport direction (102a) of the central transport track (102) is not reversible.

Clause 12. The production system (100) according to any one of the preceding clauses, characterized in that
the outer left transport track (101) has one or more outer left transport devices (161a, 161b, . . . 161i), which is/are driven for transporting the spectacle lens blanks in the transport direction (101a) of the outer left transport track (101),
the outer right transport track (103) has one or more outer right transport devices (163a, 163b, . . . 163i), which is/are driven for transporting the spectacle lens blanks in the transport direction (103a) of the outer right transport track (103),
the central transport track (102) has one or more transport devices (162a, 162b, . . . 162i), which is/are driven for transporting the spectacle lens blanks in the transport direction (102a) of the central transport track (102).

Clause 13. The production system (100) according to any one of the preceding clauses, characterized in that
a computing device (180) is present, wherein
(i) the computing device (180) is configured to calculate a fastest transport path for transporting a predetermined spectacle lens blank of the spectacle lens blanks to a predetermined process device (121, 122; 123, 124; 125, 126; . . . 135, 136; 137, 138) of the process devices (121, 122; 123, 124; 125, 126; . . . 135, 136; 137, 138) and/or
(ii) the computing device (180) is configured to calculate a shortest transport path for transporting a predetermined spectacle lens blank of the spectacle lens blanks to a predetermined process device (121, 122; 123, 124; 125, 126; . . . 135, 136; 137, 138) of the process devices (121, 122; 123, 124; 125, 126; . . . 135, 136; 137, 138) and
a control device (182) is present in order to transport the predetermined spectacle lens blank on the calculated transport path.

Clause 14. A method for operating a system (100) for producing spectacle lenses from spectacle lens blanks, which comprises
an outer left transport track (101) for transporting the spectacle lens blanks in a transport direction (101a),
a plurality of left process devices (121, 123, 125, 127, 129, 131, 133, 135, 137, 139) for the spectacle lens blanks, arranged to the left of the outer left transport track (101),
an outer right transport track (103) for transporting the spectacle lens blanks in a transport direction (103a) and
a central transport track (102) arranged between the outer left transport track (101) and the outer right transport track (103), for transporting the spectacle lens blanks in a transport direction (102a),
characterized in that
the spectacle lens blanks are transported to one or more of the left process devices (121, 123, 125, 127, 129, 131, 133, 135, 137, 139) or one or more of the plurality of right process devices (122, 124, 126, 128, 130, 132, 134, 136, 138), arranged to the right side of the outer right transport track (103), for the spectacle lens blanks via the outer left transport track (101) and/or the outer right transport track (103) and/or the central transport track (102),
the spectacle lens blanks are transported in the identical transport direction (101a, 103a) on the outer left transport track (101) and on the outer right transport track (103),
the spectacle lens blanks on the central transport track (102) are transported in the opposite or in the same transport direction (101a, 102a, 103a) to the spectacle lenses on the outer left transport track (101) and the spectacle lenses on the outer right transport track (103).

Clause 15. A computer program having program code for carrying out all method steps according to clause 14 when the computer program is loaded onto a computer and/or executed on a computer.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A system for producing spectacle lenses from spectacle lens blanks, the system comprising:
    an outer left transport track configured to transport the spectacle lens blanks in a first transport direction;
    a plurality of left process devices for the spectacle lens blanks, the left process devices being arranged to a left of the outer left transport track and being configured to at least partially convert a respective spectacle lens blank into a final spectacle lens blank or a finished spectacle lens;
    an outer right transport track configured to transport the spectacle lens blanks in a second transport direction; and
    a central transport track arranged between the outer left transport track and the outer right transport track configured to transport the spectacle lens blanks in a third transport direction, wherein
    the first transport direction of the outer left transport track and the second transport direction of the outer right transport track are identical, wherein
    the third transport direction of the central transport track is counter to the first and second transport directions of the outer left transport track and the outer right transport track or reversible;
    a plurality of right process devices for the spectacle lens blanks arranged to a right of the outer right transport track, the right process devices being configured to at least partially convert the respective spectacle lens blank into the final spectacle lens blank or finished spectacle lens, wherein
    one or more of the right process devices are arranged opposite one or more of the left process devices in relation to the left, right, and central transport tracks to form one or more process device pairs, respectively, wherein
    the one or more of the process device pairs each have a transfer device, respectively assigned to the respective process device pair the transfer device being configured to transfer the spectacle lens blanks between a respective left process device of the respective process device pair and the outer left transport track and the central transport track and to transfer the spectacle lens blanks between a respective right process device of the respective process device pair and the outer right transport track and the central transport track,
    wherein at least one of the transfer devices includes a plurality of rotation/transport devices, and wherein
    (i) the outer left transport track includes four outer left rotation/transport devices of the plurality of rotation/transport devices,
    (ii) the central transport track includes four central rotation/transport devices of the plurality of rotation/transport devices, and
    (iii) the outer right transport track includes four outer right rotation/transport devices of the plurality of rotation/transport devices.

2. The production system as claimed in claim 1, wherein the four outer left rotation/transport devices, the four central rotation/transport devices, and the four outer right rotation/transport devices are arranged to form a 3×4 matrix.

3. The production system as claimed in claim 1, wherein at least one of:
    two further left rotation/transport devices of the plurality of rotation/transport devices are arranged to a left-hand side of the four outer left rotation/transport device, or
    two further right rotation/transport devices of the plurality of rotation/transport devices are arranged to a right-hand side of the four outer right rotation/transport devices.

4. The production system as claimed in claim 1, wherein at least one of:
    a left central transport track is arranged between the outer left transport track and the central transport track and is configured to transport the spectacle lens blanks in a fourth transport direction, or
    a right central transport track is arranged between the outer right transport track and the central transport track and is configured to transport the spectacle lens blanks in a fifth transport direction.

5. The production system as claimed in claim 4, wherein at least one of:
    (i) the left central transport track includes four left central rotation/transport devices of the plurality of rotation/transport devices, or
    (ii) the right central transport track includes four right central rotation/transport devices of the plurality of rotation/transport devices.

6. The production system as claimed in claim 4, wherein the rotation/transport devices of the plurality of rotation/transport devices are rotatable in 45° steps.

7. The production system as claimed in claim 4, wherein at least one of:
    the fourth transport direction of the left central transport track is reversible, or
    the fifth transport direction of the right central transport track is reversible.

8. The production system as claimed in claim 1, wherein at least one of:
    the transport direction of the outer left transport track is not reversible,
    the transport direction of the outer right transport track is not reversible, or
    the transport direction of the central transport track is not reversible.

9. The production system as claimed in claim 1, wherein
the outer left transport track has one or more outer left transport devices, which are configured to transport the spectacle lens blanks in the first transport direction of the outer left transport track,
the outer right transport track has one or more outer right transport, which are configured to transport the spectacle lens blanks in the second transport direction of the outer right transport track, and
the central transport track has one or more transport devices, which are configured to transport the spectacle lens blanks in the third transport direction of the central transport track.

10. The production system as claimed in claim 1, further comprising:
a computing device configured to calculate at least one of:
a fastest transport path for transporting a predetermined spectacle lens blank or spectacle lens blanks to a predetermined process device of the process devices, or
a shortest transport path for transporting the predetermined spectacle lens blank or spectacle lens blanks to the predetermined process device of the process devices; and
a control device configured to control a transport of the predetermined spectacle lens blank on the fastest transport path or the shortest transport path.

11. A method for operating a system for producing spectacle lenses from spectacle lens blanks, the method comprising:
providing an outer left transport track configured to transport the spectacle lens blanks in a first transport direction;
arranging a plurality of left process devices for the spectacle lens blanks to a left of the outer left transport track, the left process devices being configured to at least partially convert a respective spectacle lens blank into a final spectacle lens blank or a finished spectacle lens;
providing an outer right transport track configured to transport the spectacle lens blanks in a second transport direction;
arranging a central transport track between the outer left transport track and the outer right transport track, the central transport track being configured to transport the spectacle lens blanks in a third transport direction;
transporting the spectacle lens blanks to one or more of the left process devices via at least one of the outer left transport track, the outer right transport track, or the central transport track;
transporting the spectacle lens blanks with an identical transport direction on the outer left transport track and the outer right transport track;
transporting the spectacle lens blanks on the central transport track in an opposite or in a same transport direction to the spectacle lenses on the outer left transport track and the spectacle lenses on the outer right transport track;
arranging a plurality of right process devices for the spectacle lens blanks to a right of the outer right transport track, the right process devices being configured to at least partially convert the respective spectacle lens blank into the final spectacle lens blank or finished spectacle lens;
arranging one or more of the right process devices opposite one or more of the left process devices in relation to the left, right, and central transport tracks to form one or more process device pairs, wherein
the one or more of the process device pairs each have a transfer device, respectively assigned to a process device pair, the transfer device being configured to transfer the spectacle lens blanks between a respective left process device of the respective process device pair and the outer left transport track and the central transport track and to transfer the spectacle lens blanks between a respective right process device of the respective process device pair and the outer right transport track and the central transport track,
wherein at least one of the transfer devices includes a plurality of rotation/transport devices, wherein
(i) the outer left transport track includes four outer left rotation/transport devices of the plurality of rotation/transport devices, wherein
(ii) the central transport track includes four central rotation/transport devices of the plurality of rotation/transport devices, and wherein
(iii) the outer right transport track comprises four outer right rotation/transport devices of the plurality of rotation/transport devices; and
transporting the spectacle lens blanks to one or more of the plurality of right process devices, arranged to a right side of the outer right transport track, for the spectacle lens blanks via at least one of the outer left transport track, the outer right transport track, or the central transport track.

12. A computer program stored on a non-transitory storage medium and having program code configured to carry out the method as claimed in claim 11, when the computer program is loaded onto a computer and/or executed on a computer.

13. A non-transitory computer-readable storage medium comprising a computer program with program code configured to carry out the method as claimed in claim 11, when the computer program is loaded onto a computer and/or executed on a computer.

14. A method for producing a spectacle lens from a spectacle lens blank, comprising: operating a system for producing spectacle lenses from spectacle lens blanks as claimed in claim 11.

15. A system for producing spectacle lenses from spectacle lens blanks, the system comprising:
an outer left transport track configured to transport the spectacle lens blanks in a first transport direction;
a plurality of left process devices for the spectacle lens blanks, the left process devices being arranged to a left of the outer left transport track and being configured to at least partially convert a respective spectacle lens blank into a final spectacle lens blank or a finished spectacle lens;
an outer right transport track configured to transport the spectacle lens blanks in a second transport direction;
a central transport track arranged between the outer left transport track and the outer right transport track, the central transport track being configured to transport the spectacle lens blanks in a third transport direction, wherein
the first transport direction of the outer left transport track and the second transport direction of the outer right transport track are identical, wherein
the third transport direction of the central transport track is counter to the first and second transport directions of the outer left transport track and the outer right transport track or reversible;

a plurality of right process devices for the spectacle lens blanks arranged to a right of the outer right transport track, the right process devices being configured to at least partially convert a respective spectacle lens blank into the final spectacle lens blank or the finished spectacle lens;

one or more of the right process devices being arranged opposite one or more of the left process devices in relation to the left, right, and central transport tracks to form one or more process device pairs;

the one or more of the process device pairs each having a transfer device, respectively assigned to a process device pair, the transfer device being configured to transfer the spectacle lens blanks between a respective left process device of the respective process device pair and the outer left transport track and the central transport track and to transfer the spectacle lens blanks between a respective right process device of the respective process device pair and the outer right transport track and the central transport track, wherein at least one of the transfer devices includes a plurality of rotation/transport devices, wherein each rotation/transport device has a dedicated transport drive and a dedicated rotation drive, and wherein (i) the outer left transport track includes four outer left rotation/transport devices of the plurality of rotation/transport devices, (ii) the central transport track includes four central rotation/transport devices of the plurality of rotation/transport devices, and (iii) the outer right transport track includes four outer right rotation/transport devices of the plurality of rotation/transport devices.

16. A method for operating a system for producing spectacle lenses from spectacle lens blanks, the method comprising:

providing an outer left transport track configured to transport the spectacle lens blanks in a first transport direction;

providing a plurality of left process devices for the spectacle lens blanks, the left process devices being arranged to a left of the outer left transport track and being configured to at least partially convert a respective spectacle lens blank into a final spectacle lens blank or a finished spectacle lens;

providing an outer right transport track configured to transport the spectacle lens blanks in a second transport direction;

arranging a central transport track arranged between the outer left transport track and the outer right transport track, the central transport track being configured to transport the spectacle lens blanks in a third transport direction;

transporting the spectacle lens blanks to one or more of the left process devices via at least one of the outer left transport track, the outer right transport track, or the central transport track;

transporting the spectacle lens blanks in an identical transport direction on the outer left transport track and on the outer right transport track;

transporting the spectacle lens blanks on the central transport track in an opposite or in a same transport direction to the spectacle lenses on the outer left transport track and the spectacle lenses on the outer right transport track, wherein the production system further includes:

a plurality of right process devices for the spectacle lens blanks, the right process devices being arranged to a right of the outer right transport track and being configured to carry out at least one process step on the respective spectacle lens blank in order to convert the latter into the final spectacle lens blank or finished spectacle lens, wherein the one or more of the right process devices are arranged opposite one or more of the left process devices in relation to the left, right, and central transport tracks to form one or more process device pairs, wherein the one or more of the process device pairs each have a transfer device, respectively assigned to a process device pair, the transfer device being configured to transfer the spectacle lens blanks between a respective left process device of the respective process device pair and the outer left transport track and the central transport track and to transfer the spectacle lens blanks between a respective right process device of the respective process device pair and the outer right transport track and the central transport track, wherein at least one of the transfer devices includes a plurality of rotation/transport devices, wherein each rotation/transport device has a dedicated transport drive and a dedicated rotation drive, wherein (i) the outer left transport track includes four outer left rotation/transport devices of the plurality of rotation/transport devices, (ii) the central transport track includes four central rotation/transport devices of the plurality of rotation/transport devices, and (iii) the outer right transport track includes four outer right rotation/transport devices of the plurality of rotation/transport devices, and wherein the spectacle lens blanks are transported to one or more of the plurality of right process devices, arranged to a right side of the outer right transport track, for the spectacle lens blanks via at least one of the outer left transport track, the outer right transport track, or the central transport track.

17. A system for producing spectacle lenses from spectacle lens blanks, the system comprising:

an outer left transport track configured to transport the spectacle lens blanks in a first transport direction;

a plurality of left process devices for the spectacle lens blanks, the left process devices being arranged to a left of the outer left transport track and being configured to at least partially convert a respective spectacle lens blank into a final spectacle lens blank or a finished spectacle lens;

an outer right transport track configured to transport the spectacle lens blanks in a second transport direction;

a central transport track arranged between the outer left transport track and the outer right transport track, the central transport track being configured to transport the spectacle lens blanks in a third transport direction, wherein the first transport direction of the outer left transport track and the second transport direction of the outer right transport track are identical, and wherein the transport direction of the central transport track is counter to the transport directions of the outer left transport track and the outer right transport track or reversible;

a plurality of right process devices for the spectacle lens blanks, the plurality of right process devices being arranged to a right of the outer right transport track, the right process devices being configured to carry out at least one process step on the respective spectacle lens blank in order to convert the latter into the final spectacle lens blank or finished spectacle lens;

a computing device configured to calculate at least one of:
(i) a fastest transport path for transporting a predetermined spectacle lens blank of the spectacle lens blanks to a predetermined process device of the plurality of process devices, or
(ii) a shortest transport path for transporting the predetermined spectacle lens blank of the spectacle lens blanks to the predetermined process device of the plurality of process devices; and a control device configured to control a transport of the predetermined spectacle lens blank on the calculated transport path.

18. A method for operating a system for producing spectacle lenses from spectacle lens blanks, the method comprising:

providing an outer left transport track configured to transport the spectacle lens blanks in a first transport direction;

arranging a plurality of left process devices for the spectacle lens blanks to a left of the outer left transport track, the plurality of left process devices being configured to at least partially convert a respective spectacle lens blank into a final spectacle lens blank or a finished spectacle lens;

providing an outer right transport track configured to transport the spectacle lens blanks in a second transport direction;

arranging a central transport track between the outer left transport track and the outer right transport track, the central transport track being configured to transport the spectacle lens blanks in a third transport direction;

transporting the spectacle lens blanks to one or more of the left process devices via at least one of the outer left transport track, the outer right transport track, or the central transport track;

transporting the spectacle lens blanks in an identical transport direction on the outer left transport track and on the outer right transport track;

transporting the spectacle lens blanks on the central transport track in an opposite or in a same transport direction to the spectacle lenses on the outer left transport track and the spectacle lenses on the outer right transport track;

arranging a plurality of right process devices for the spectacle lens blanks to a right of the outer right transport track, the right process devices being configured to carry out at least one process step on the respective spectacle lens blank in order to convert the latter into the final spectacle lens blank or finished spectacle lens; and calculating at least one of
(i) a fastest transport path for transporting a predetermined spectacle lens blank of the spectacle lens blanks to a predetermined process device of the plurality of process devices, or
(ii) a shortest transport path for transporting a predetermined spectacle lens blank of the spectacle lens blanks to a predetermined process device of the plurality of process devices.

* * * * *